United States Patent [19]

Schultz

[11] 4,241,403
[45] Dec. 23, 1980

[54] METHOD FOR AUTOMATED ANALYSIS OF VEHICLE PERFORMANCE

[75] Inventor: John P. Schultz, Deerfield, Ill.

[73] Assignee: Vapor Corporation, Chicago, Ill.

[21] Appl. No.: 699,075

[22] Filed: Jun. 23, 1976

[51] Int. Cl.³ .............................................. G06F 15/20
[52] U.S. Cl. .................................................. 364/300
[58] Field of Search ........................ 441/1; 340/172.5; 235/150.2, 150.24, 151.3, 151.32; 246/63 R, 182 B, 182 C, 187 B; 104/152, 153; 364/200 MS File, 300, 565, 424, 520, 551, 900 MS File, 426, 436, 552, 579, 475, 580

[56] References Cited

U.S. PATENT DOCUMENTS

| | | | |
|---|---|---|---|
| 3,485,093 | 12/1969 | Muller et al. | 235/150.2 X |
| 3,655,962 | 4/1972 | Kock | 246/187 B X |
| 3,688,099 | 8/1972 | Buscher | 235/150.2 X |
| 3,825,744 | 7/1974 | Sibley et al. | 246/182 C |
| 3,882,305 | 5/1975 | Johnstone | 364/551 |
| 3,927,308 | 12/1975 | Summers et al. | 235/151.3 |
| 3,938,092 | 2/1976 | Callahan | 346/33 D X |
| 3,974,992 | 8/1976 | Matty | 246/182 B |
| 4,079,447 | 3/1978 | Garziera | 364/200 |

*Primary Examiner*—Raulfe B. Zache
*Attorney, Agent, or Firm*—Francis J. Lidd

[57] ABSTRACT

Data is recorded on board a vehicle and includes such items as vehicle speed, distance traveled and a predetermined set of operating events. The data is communicated to a computer where a computer program compares the data with a predetermined profile and performs an analysis of the vehicle performance.

27 Claims, 16 Drawing Figures

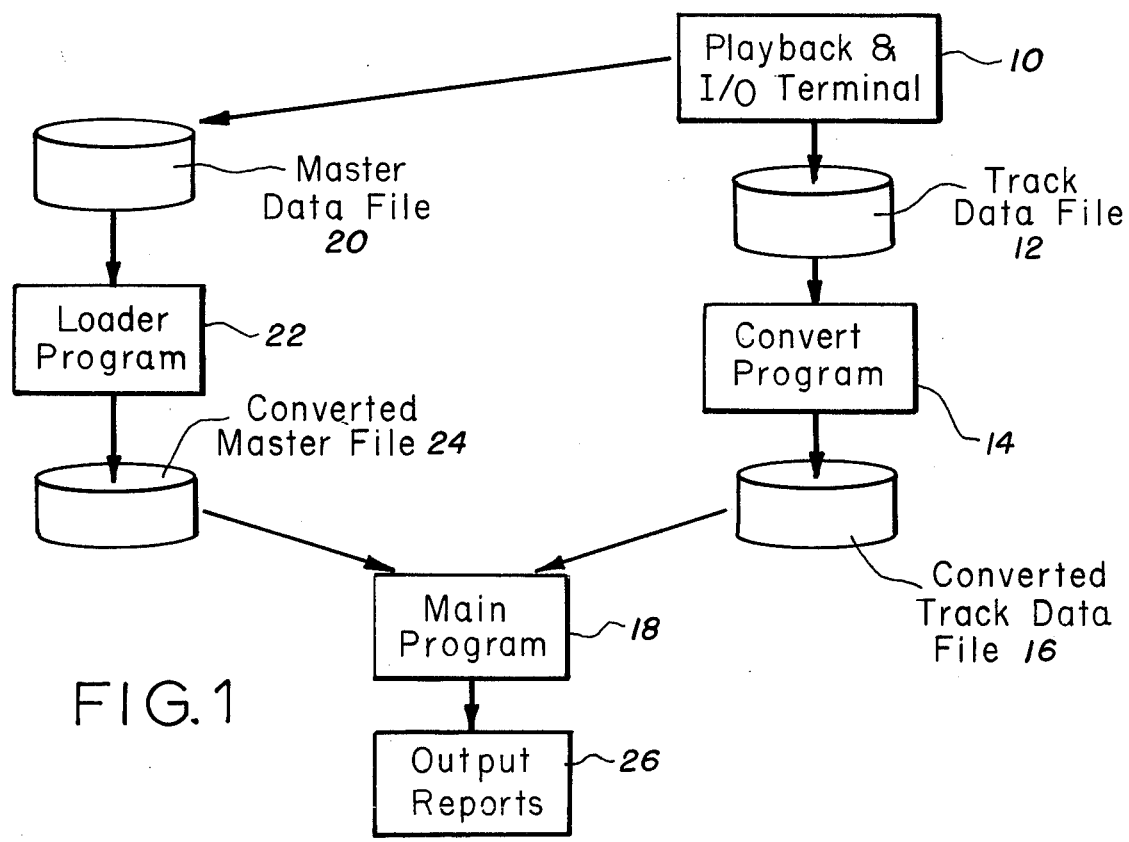
FIG. 1
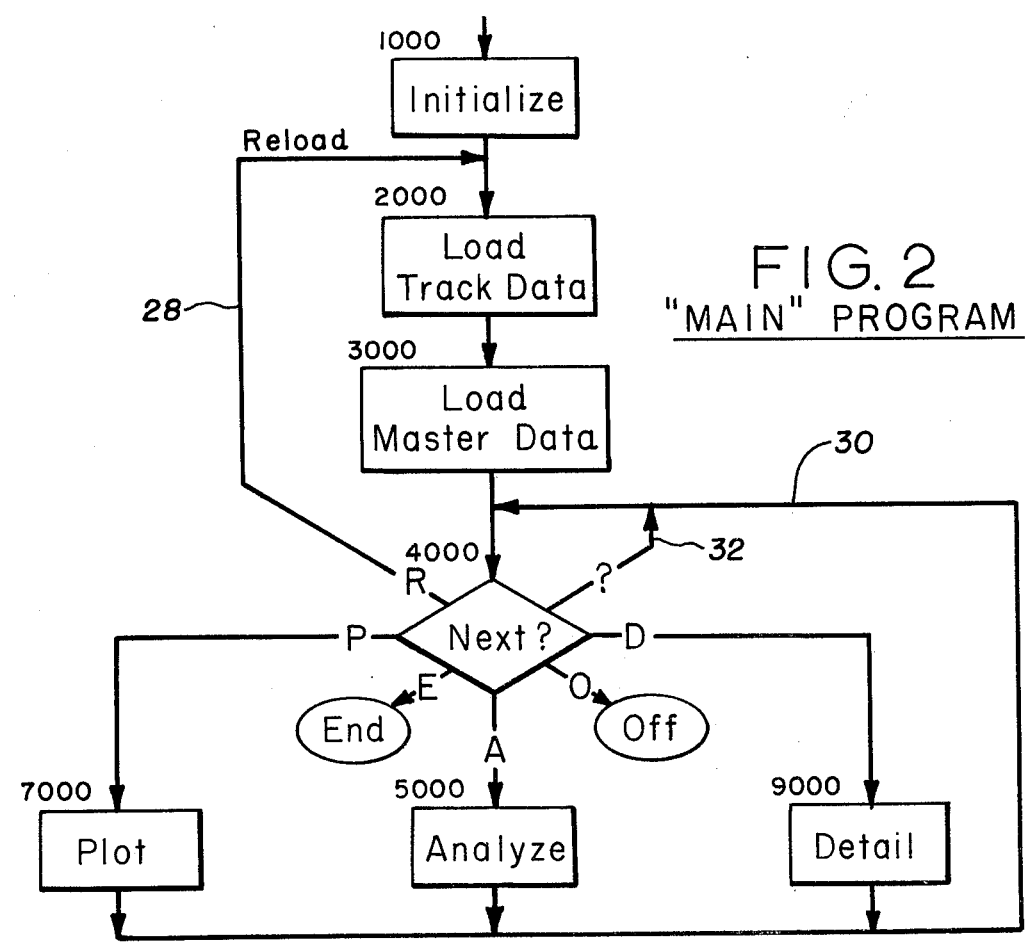
FIG. 2 "MAIN" PROGRAM

PLOT

INPUT FILE SAMPLE
MASTER FILE MASTER

```
A*P*R*D OR E
?ANALYZE—33

SPEED TOL?—34
                         —38
70—36
########## ANALYZE###############
      FROM      TO      LIM.   OUR    AT
      42.00    62.00    60     20    46.50—39    }—29
 40   62.00    82.00    40     15    64.50
      90.00   113.00    40     30    91.00
  3  68—41

A*P*R*D OR E
?PLOT
          —42
LIMITS?
            —43
70 100
LINES PER MILE?
                              —44
?-4  —46  —48
MPMDPT*0**123456789**0   9980
  12.00   *
  16.00   *    —54            *  —62          —60
  20.00   *                 *                $
  24.00   *   —52          *                 $
  28.00   *                  *     —63       $
  32.00   *                   *              $
  36.00   *                                  $  *
  40.00   *                                  $     *
  44.00   *                                  $      *
  48.00   *                                  $   *
  52.00   *                                  $ *
  56.00 50*                                $  *
  60.00   *                              *    $
  64.00   *                              *    $
  68.00   *                            *      $
  72.00 P *                         *         $
  76.00 P *                        $
  80.00 P *                       $
  84.00 P *                       $
  88.00 P *                        $    *
  92.00 P *                        $      *
  96.00 P *         —45            $        *
 100.00 P *                        $         *
**MP*MDPT*0****1****2****3****4****5****6****7****8****9****0
* A*P*R*D OR E
```

✶ Analyze, Plot, Reload, Detail or End

FIG. 4

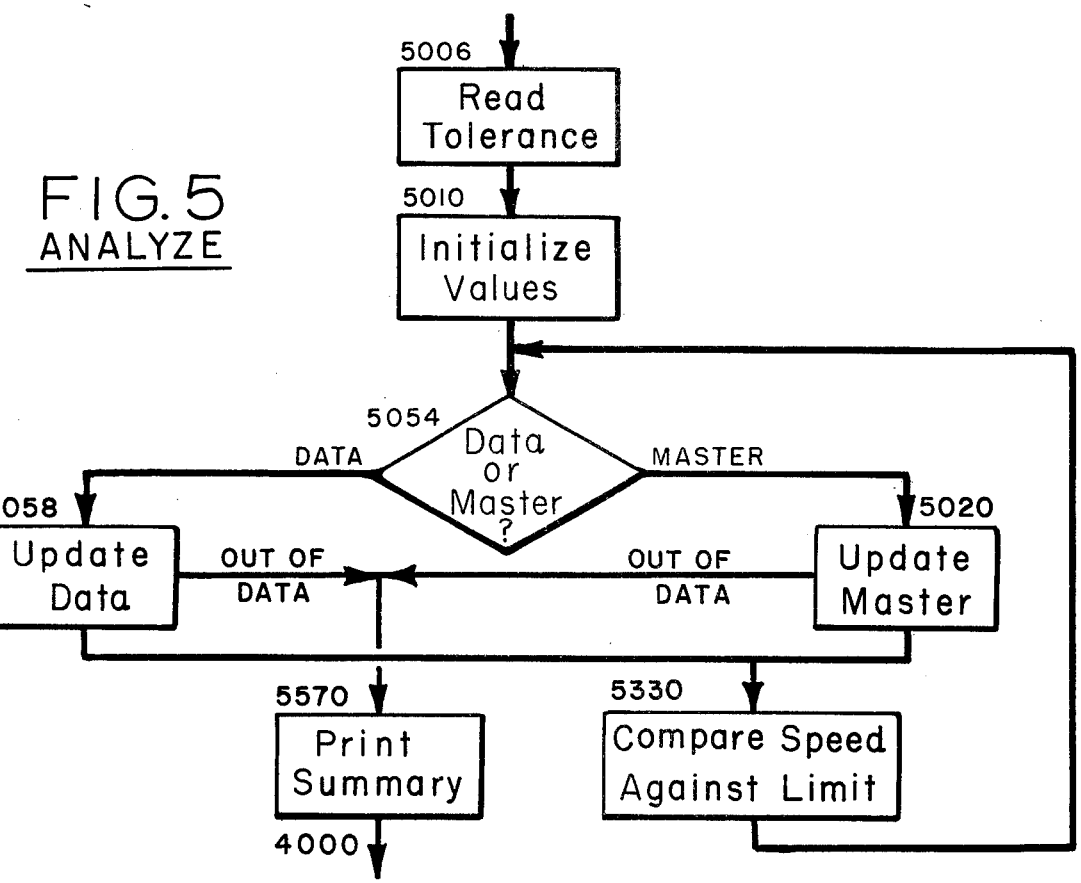
FIG. 5 ANALYZE
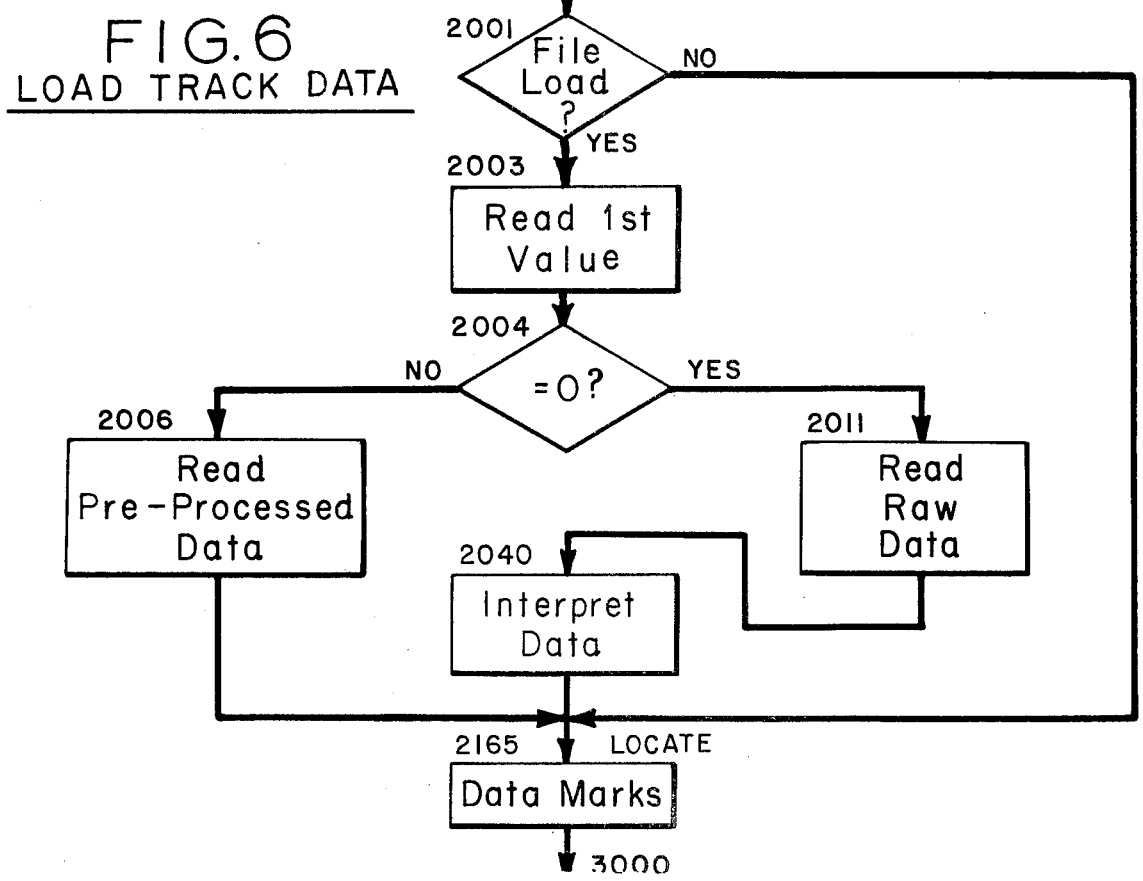
FIG. 6 LOAD TRACK DATA

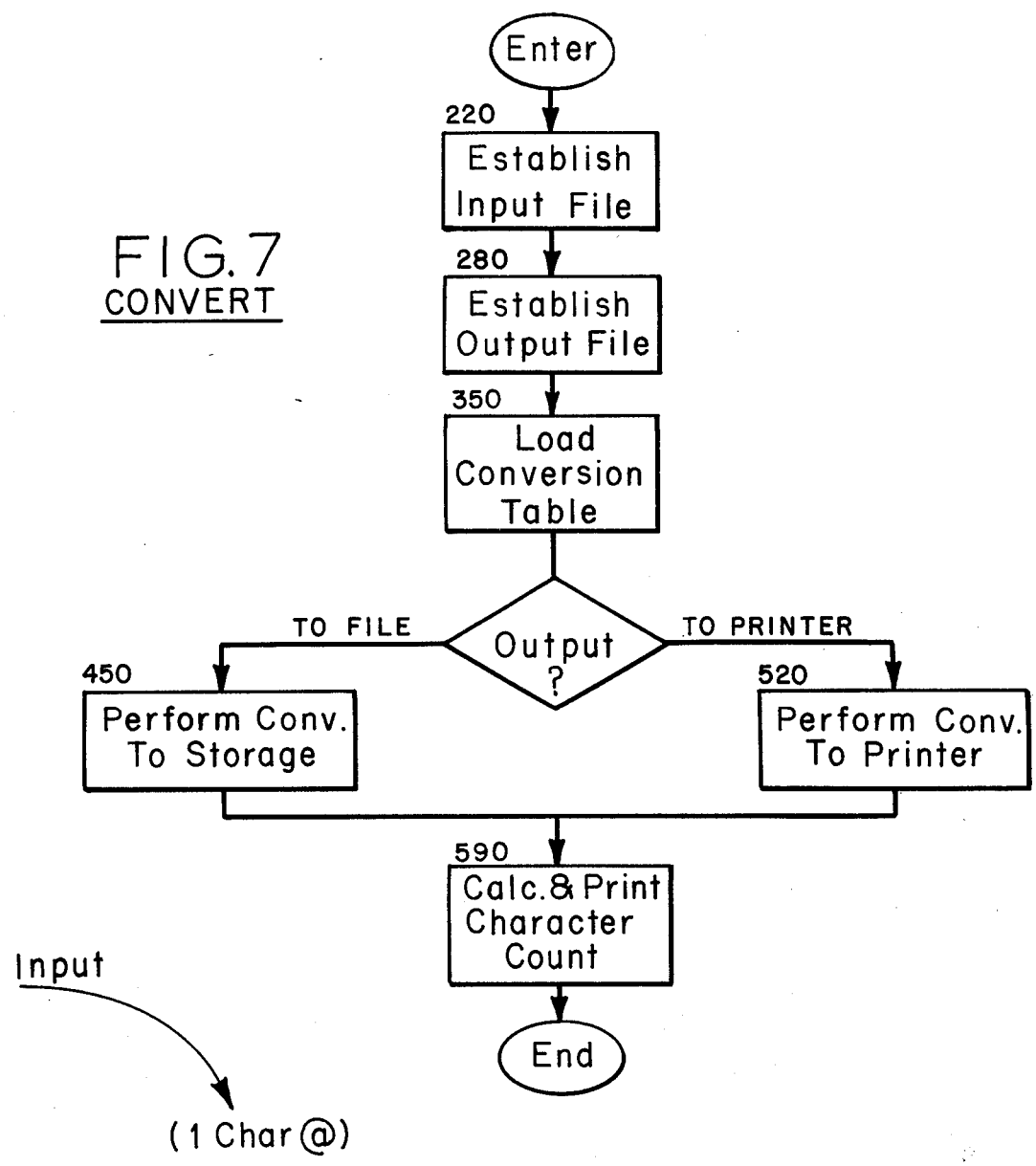
FIG. 7 CONVERT
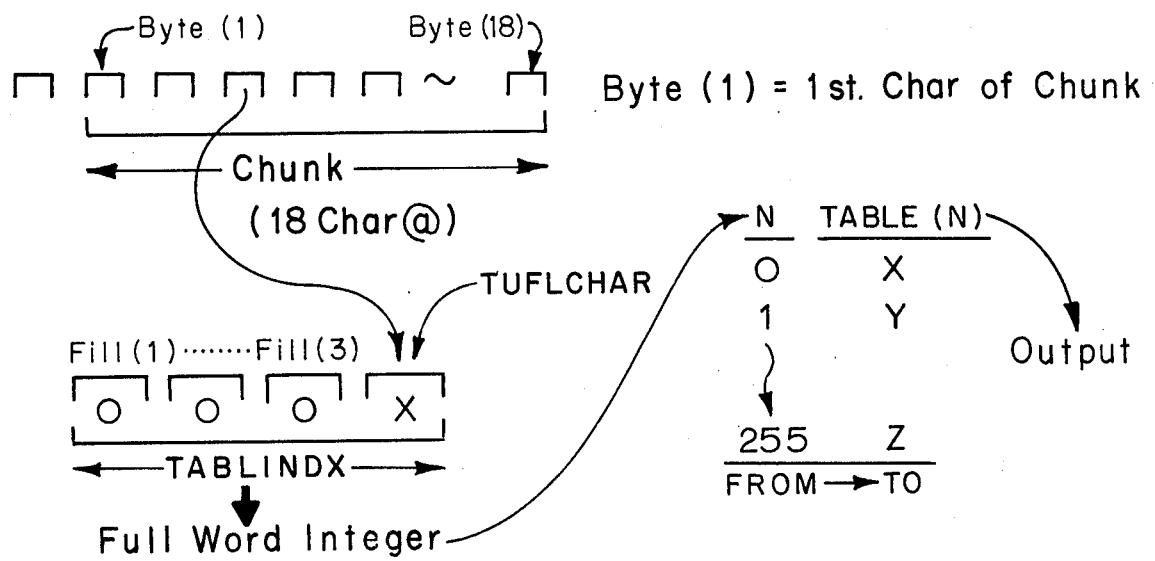

```
CONVERT      15:58    03/05/74    TUESDAY     I05

100 CONVERT : PROCEDURE :
110 DECLARE CONVTABL ENVIRONMENT(LINE) INPUT ,
120         (TAPUNF,DATAFILE) ENV(INTERNAL),
130         BYTE(0:0) CHAR(1),CHUNK CHAR(18) ,
140         TABLINDX(0:0) FIXED(9), FILL CHAR(3),
150         TUFLCHAR CHAR(1), TABLE(0:255) FIXED(9),
160         (SUBSCRPT,VALUE,POSITION) FIXED(9),
170         (SOURCE,DESTIN) CHARACTER(8);
180 ON ENDFILE(TAPUNF) GO TO ENDUP ;
190 ON ERROR GO TO FETCH ;
200 FETCH : K = 0 ;
210
220 /* OPEN INPUT FILE (TAPUNF) */
230 PUT LIST('INPUT FILE') ;
240 GET FILE(SYSIN) LIST(SOURCE) ;
250 PUT FILE(SYSPRINT) LIST(SOURCE) ;
260 OPEN FILE(TAPUNF) TITLE(SOURCE) INPUT ;
270
280 /* OPEN OUTPUT FILE (DATAFILE) */
290 PUT SKIP(2) LIST('OUTPUT FILE') ;
300 GET FILE(SYSIN) LIST(DESTIN) ;
305 IF DESTIN = '' THEN DESTIN = 'SYSPRINT' ;
310 PUT FILE(SYSPRINT) LIST(DESTIN) ;
320 IF DESTIN = 'SYSPRINT' THEN PUT SKIP ; ELSE
330 OPEN FILE(DATAFILE) TITLE(DESTIN) OUTPUT ;
340
350 /* ASSIGN TABLE DEFAULT VALUE */ TABLE = -1 ;
360 TABLINDX(1) = 0 ;
370
380 /* LOAD CONVERTION TABLE */
390 OPEN FILE(CONVTABL) ;
400 ON ENDFILE(CONVTABL) GO TO ENDLOAD ;
410 READ : GET FILE(CONVTABL) LIST(SUBSCRPT,VALUE) ;
420 TABLE(SUBSCRPT) = VALUE ;   GO TO READ ;
430 ENDLOAD : IF DESTIN = 'SYSPRINT' THEN GO TO LISTFILE ;
440
450 /* CONVERT FILE */
460 LOOP : GET FILE(TAPUNF) LIST(CHUNK) ;
470 DO POSITION = 1 TO 18 ;
480 TUFLCHAR = BYTE(POSITION) ;
490 PUT FILE(DATAFILE) LIST(TABLE(TABLINDX(1))) ;
500 END ;   K = K + 1 ; GO TO LOOP ;
510
520 /* LIST FILE */
530 LISTFILE : GET FILE(TAPUNF) LIST(CHUNK) ;
540 PUT SKIP ;    DO POSITION = 1 TO 18 ;
550 TUFLCHAR = BYTE(POSITION) ;
560 PUT FILE(SYSPRINT) EDIT(TABLE(TABLINDX(1))) (F(4)) ;
570 END ;   K = K + 1 ;    GO TO LISTFILE ;
580
590 /* EXIT */
600 ENDUP : K = K * 18 ;
610 PUT SKIP(2) LIST(K,'CHARACTERS LOADED') ;
620 CLOSE FILE(CONVTABL), FILE(DATAFILE), FILE(TAPUNF) ;
630 END CONVERT ;
```

FIG. 8

```
M          15:49    03/05/74   TUESDAY    I05

1000 "* MAIN *"
1020 INTEGER*2 TAPE(30000),DATA(3,10000),TM/30000/,NT/10000/, %
1030           MASTER(3,500),MTM/500/
1040 INTEGER*4 KI/5/,KO/6/,KD/7/,KM/8/
1050 INTEGER*2 E1(16)/0,1,0,1,0,1,0,1,0,1,0,1,0,1,0,1/, %
1060           E3(16)/0,0,1,1,0,0,1,1,0,0,1,1,0,0,1,1/,E5D(16)/8*0,8*1/,%
1070           E4(16)/4*0,4*1,4*0,4*1/,E5(16)/8*0,1,2,1,2,1,2,1,2/
1072 INTEGER*4 EV(16)/' ',' P',' M',' M P',' T',' PT',' M T',' M PT', %
1073           ' D',' DP',' MD',' MDP',' D T',' DPT',' MD T',' MDPT'/
1075 INTEGER*2 PLOT(53)/53*' '/,CM/'$'/,CD/'*'/,CB/' '/
1080 INTEGER*4 EC,FLAG,PM/1/,PD/1/,MS/1/,SPDCHK,TMAX
1090 INTEGER*2 YES/'Y'/,NO/'N'/,A/'A'/,P/'P'/,D/'D'/,E/'E'/,R/'R'/, %
1092           REPLY,U/'U'/,O/'O'/,MC/'M'/,C/'C'/,S/'S'/,XC/'X'/,LM/'L'/
1100    REAL*8 REPLY8(2),NULL/' '/,REPLY9(2)
1110 EQUIVALENCE (DATA(1,1),TAPE(1))
1500
1510 "* OPEN FILES *"
1520 1500 WRITE(KO,120)
1530 READ(KI,108) REPLY9
1540 IF(REPLY9(1).NE.NULL) CALL OPEN(KD,REPLY9,'INPUT')
1550 WRITE(KO,122)
1560 READ(KI,108) REPLY8
1570 IF(REPLY8(1).NE.NULL) CALL OPEN(KM,REPLY8,'INPUT')
4000
4001 "* PROCESS REQ *"
4010 4000 WRITE(KO,400)
4020 4001 READ(KI,101) REPLY
4030 IF(REPLY=P) GO TO 7000
4040 IF(REPLY=A) GO TO 5000
4050 IF(REPLY=D) GO TO 9000
4060 IF(REPLY=R) GO TO 1500
4070 IF(REPLY=E) GO TO 9999
4075 IF(REPLY=O) GO TO 9998
4080 WRITE(KO,404)

5000 5000 WRITE(KO,402)
5010 GO TO 4000
7000 7000 WRITE(KO,402)
7010 GO TO 4000
9000 9000 WRITE(KO,402)
9010 GO TO 4000
```

FIG. 9

```
M          16:03    03/05/74   TUESDAY    I05
99000
99001 "* ENDUP*"
99002 9998 CALL COM('OFF')
99003 9999 STOP
99100
99101 101 FORMAT(2A1)
99108 108 FORMAT(2A8)
99120 120 FORMAT(' INPUT FILE?')
99121 121 FORMAT(' I*F*C*E',I8)
99122 122 FORMAT(' MASTER FILE?')
99201 201 FORMAT(I8,' LOADED')
99210 210 FORMAT(' LOADING')
99212 212 FORMAT(' SPILL?')

99251 251 FORMAT(' IV ',I6)
99261 261 FORMAT(' FEWER THAN 2 MARKS')
99271 271 FORMAT(' APPROX DIST COVERED',F10.1)
99291 291 FORMAT(I6,' SYNC ERRORS')
99310 310 FORMAT(' MASTER LT 2 MARKS')
99320 320 FORMAT(' ACTUAL DIST COVERED',F11.2,F10.4,'=UNIT DIST.',/)
99400 400 FORMAT('0A*P*R*D OR E')
99402 402 FORMAT(' UNAVAILABLE')
99404 404 FORMAT('+I V L D R Q',/,'+ N A I   E .',/)
99500 500 FORMAT(' SPEED TOL?')
99501 501 FORMAT(' ############## ANALYZE ###############',/, %
99502          '      FROM      TO     LTM.  OVR.')
99503 503 FORMAT(2F10.2,2I6,F10.2)
99504 504 FORMAT(2F10.2,' *BRK ERROR*',F6.2)
99506 506 FORMAT(' NO SPEED VIOLATIONS DETECTED')
99700 700 FORMAT(' LIMITS?')
99701 701 FORMAT(' LINES PER MILE?')
99702 702 FORMAT(' ***MP**MDPT*0****1****2****' %
99703          '3****4****5****6****7****8****9****0 ',I7)
99704 704 FORMAT(F8.2,A4,'*',52A1,'+')
99706 706 FORMAT(I6,' LINES - RUN?')
99707 707 FORMAT(12X,'*',20X,'OUT OF TRACK',A4)
99999 END
```

FIG. 10

```
L           15:53    03/05/74   TUESDAY     I05

2000 "* LOAD DATA *"
2001 IF(REPLY9(1)=NULL) GO TO 2910
2002 WRITE(KO,210)
2003 READ(KD) NSS
2004 IF(NSS<0) GO TO 2000
2006 READ(KD) NT,((DATA(I,J),J=NSS,NT),I=1,3)

2008 WRITE(KO,201) NULL
2009 GO TO 2910
2011 2000 DO 2001 I=1,TM
2012 2001 READ(KD,END=2003) TAPE(I)
2014 WRITE(KO,121) TM
2016 2003 CALL CLOSE(KD)
2018 TMAX = I - 1

2026 2005 WRITE(KO,201) TMAX
2036
2038 "* REFORMAT DATA *"
2040 2050 NT = TM/3 - 1
2042 N=NT
2044 L=3
2046 I=TMAX
2048 KP=1

2052 ISE=0
2054 DATA(1,N)=0
2056 IDIST=0
2058 DATA(3,N+1)=1
2060 "* START *"
2062 DO 2900 J=3,TMAX
2064 K = TAPE(I)
2066 IF(K.LT.0) GO TO 2510
2068 2505 GO TO (2600,2700,2800),L
2070 2510
     K=0
2074 WRITE(KO,251) I
2076 GO TO 2505

2084 "* DISTANCE *"
2086 2600 IF(K<64) GO TO 2601
2088 K=K-64
2090 DATA(1,N+1) = - DATA(1,N+1)
2092 2601 IF(K<32) GO TO 2602
2094 K=K-32
2096 DATA(3,N+1) = DATA(3,N+1) + 8
2098 2602 DATA(1,N) = K
2100 IDIST = IDIST + K
2102 L=3
2104 GO TO 2900
```

FIG. 11

```
L            15:43    03/05/74   TUESDAY      I05

2106 "* SPEED *"
2108 2700 DATA(2,N) = K
2110 L = 1
2112 N = N - 1
2114 GO TO 2900
2116 "* EVENT CODE *"
2118 2800 L = 2
2120 IF(K=64) GO TO 2820
2122 IF(K<64) GO TO 2810
2124 K = K - 64
2126 IF(K>26) GO TO 2810
2128 M=K/8*2
2130 K=K-4*M
2132 IF(K>1) GO TO 2801
2136 DATA(3,N) = M+1
2138 GO TO 2900
2140 2801 DATA(3,N) = M+2
2142 GO TO 2900
2144 2810 ISE=ISE+1
2146 IF(ISE=50) GO TO 2905
2148 2820 DATA(3,N) = 1
2150 2900 I = I - 1
2152 "* END *"
2154 2905 CONTINUE
2156 IF(ISE>0) WRITE(KO,291) ISE
2158 NSS = N + 1
2160 2910 NS = NSS
2162
2164 "* MARKS *"
2165 J = 0
2167 NM2 = 0
2168 NDIST = 0
2170 NDISTM = 0
2172 DO 2930 N=NS,NT
2174 IF(E3(DATA(3,N)).NE.1) GO TO 2930
2175 IF(E3(DATA(3,N-1))=1) GO TO 2930
2176 IF(J.GE.1) GO TO 2932
2178 NS = N
2180 NDISTM = NDIST
2182 J = 1
2184 GO TO 2930
2186 2932 IF(J=2) GO TO 2930
2188 NDISTM = NDIST - NDISTM
2190 NM2 = N
2192 J = 2
2194 2930 NDIST = NDIST + DATA(1,N)
2196 IF(J.NE.2) WRITE(KO,261)
2198 X =       NDIST/20
2200 WRITE(KO,271) X
```

FIG. 12

```
L            15:38    03/05/74   TUESDAY    I05
3000
3010
3020  "* LOAD MASTER FILE *"
3030  SM = 1./100.
3040  3000 IF(REPLY8(1)=NULL) GO TO 3100
3050  WRITE(KO,210)
3060  J=0
3070  M=1
3080  MDIST=0
3090  3010 READ(KM,END=3030) (MASTER(I,M),I=1,3)
3100  IF(MASTER(3,M)>-1) GO TO 3012
3110  GO TO 3010
3120  3012 IF(E4(MASTER(3,M)+1).NE.1) GO TO 3020
3130  IF(J.GE.1) GO TO 3015
3140  MS = M
3150  J = 1
3160  MDISTM = MDIST
3170  STARTR = SM*MDIST
3180  GO TO 3020
3190  3015 IF(J.GE.2) GO TO 3020
3200  J = 2
3210  MDISTM = MDIST - MDISTM
3220  3020 MDIST = MDIST + MASTER(1,M)
3230  M = M + 1
3240  IF(M.LE.MTM) GO TO 3010
3245  WRITE(KO,121) MTM
3250  3030 MT = M - 1
3260  WRITE(KO,201) MT
3270  IF(J.NE.2) WRITE(KO,310)

3290  CALL CLOSE(KM)
3300

3340  "* DATA SCALE *"
3350  3200 SC=1.
3360  DC=0.
3370  IF(NDISTM.NE.0)DC=SM*FLOAT(MDISTM)/FLOAT(NDISTM)
3380  IF(DC=0.)DC=0.05*ISIGN(1,NDIST)
3390  DIST=DC*NDIST
3400  WRITE(KO,320) DIST,DC
3410  DCP = ABS(DC)
```

FIG. 13

```
A          15:34    03/05/74  TUESDAY      I05

5000  "* ANALYZE *"
5006  5000 WRITE(KO,500)
5008  READ(KI,*) MTOL
5010  M = MS
5012  N = NS - 1
5014  DISTD = STARTR
5016  DISTM = STARTR
5018  SDIST = STARTR
5020  FDIST = STARTR
5022  DISTL = DISTD
5024  DISTM = DISTM + SM*MASTER(1,M)
5026  LIMIT = MASTER(2,M)
5028  NDIST = 0
5030  WRITE(KO,501)
5032  ISV = 0
5034  BDIST = 0.0
5036  TDIST = 0.0
5038  MAXOVR = 0
5040  SPDCHK = 0
5042  LAST = 0
5044  FLAG = 0
5046  NE1 = 0
5048  NE5 = 0
      LMEC = 0
5050
5052  LMEC = 1 + MASTER(3,M)
5054  5010 IF(DISTD.GT.DISTM) GO TO 5030
5056
5058  "* UPDATE DATA *"
5060  5020 IF(FLAG.NE.0) GO TO 5027
5062  N = N + 1
5064  IF(N.GT.NT) GO TO 5090
5066  NDIST = NDIST + DATA(1,N)
5068  ISPEED = SC*DATA(2,N)+.2
5070  IF(DATA(3,N+1)=1) GO TO 5025
5072  IF(DATA(1,N)=1) GO TO 5028
5074  FLAG = 1
5076  NDIST = NDIST - INCR
5078  5025 EC = 1

5082  5026 DISTD = STARTR + DC*NDIST
5084  IF(DISTD.LT.DISTL) GO TO 5020
5086  DISTL = DISTD
5088  GO TO 5060
5090  5027 FLAG = 0
5092  NDIST = NDIST + INCR
5094  5028 EC = DATA(3,N+1)

5098  IF(E5(EC)>0) NE5=NE5 +1
5099  "* RESTRICTED BRKS *"
5100  IF(LEC - E5D(EC)) 5005,5026,5007
5101  5005 Z = FDIST
5102  GO TO 5029
5103  5007 IF(E3(LMEC)=0) GO TO 5029

5107  WRITE(KO,504) Z, F DIST
5108  5029 LEC = E5D(EC)
5109  GO TO 5026
```

FIG. 14

```
A           15:31     03/05/74   TUESDAY     I05

5110
5120 "* UPDATE MASTER *"
5130 5030 M = M + 1
5140 IF(M.GT.MT) GO TO 5090
5150 DISTM = DISTM + SM*MASTER(1,M)
5160 LIMIT = MASTER(2,M)
5170 NMEC = MASTER(3,M) + 1
5180 IF(NMEC=LMEC) GO TO 5059
5190 "* REQ_DYNAM BRK *"
5200 IF(E5(LMEC)-E5(NMEC)) 5032,5036,5034
5210 5032 NE5 = 0
5220 IF(E5(EC)=2) NE5 = 1
5230 E5MP = FDIST
5240 GO TO 5036
5250 5034 X = ABS((NE5*DC) / (FDIST-E5MP))
5260 IF(X.GT  50  ) GO TO 5036

5270 WRITE(KO,504) E5MP,FDIST,X
5280 "* OTHER EVENTS *"
5290 5036 CONTINUE
5300 5059 LMEC = NMEC
5310
5320 "* CHECK SPEED *"
5330 5060 SDIST = FDIST
5340 FDIST = AMIN1(DISTD,DISTM)
5350 IF(ISPEED.LE.LIMIT+MTOL) GO TO 5062
5360 ISV = 1
5370 IF(BDIST=0.0) BDIST = SDIST
5380 IOVR = ISPEED - LIMIT
5390 IF(IOVR.LE.MAXOVR) GO TO 5070
5400 MAXOVR = IOVR
5410 MLIMIT = LIMIT
5420 VDISTM = (FDIST+SDIST) / 2.
5430 GO TO 5070
5440 5062 IF(ISV=0) GO TO 5070
5450 ISV = 0
5460 SPDCHK = SPDCHK + 1
5470 VDIST = SDIST - BDIST
5480 TDIST = TDIST + VDIST

5490 WRITE(KO,503) BDIST, SDIST,MLIMIT,MAXOVR,VDISTM
5500 IF(LAST=1) GO TO 5094
5510 BDIST = 0.0
5520 MLIMIT = 0
5530 MAXOVR = 0
5540 5070 GO TO 5010
5550
5560 "* OUT OF DATA *"
5570 5090 IF(ISV=0) GO TO 5094
5580 LAST = 1
5590 GO TO 5062
5600 5094 IF(SPDCHK=0) GO TO 5095
5610 WRITE(KO,*) SPDCHK,TDIST
5620 GO TO 4000
5630 5095 WRITE(KO,506)
5640 GO TO 4000
```

FIG. 15

```
P           15:11   03/05/74   TUESDAY     I05

7000  "* PLOT *"
7030  7000 WRITE(KO,700)
7040  READ(KI,*) START,FINISH
7050  7001 WRITE(KO,701)
7060  READ(KI,*) I
7070  IF(I.EQ.0) GO TO 7001
7080  SCALE = FLOAT(IABS(I))
7090  IF(I.GT.0) SCALE=1.0/SCALE
7100  IF(START.LT.STARTR) START=STARTR
7110  LINES = (FINISH-START)/SCALE + 1
7120  IF(LINES.LE.41) GO TO 7005
7130  WRITE(KO,706) LINES
7140  READ(KI,101) REPLY
7150  IF(REPLY.NE.YES) GO TO 4000
7160  7005 FLAG = CD
7170  M = MS - 1
7180  N = NS - 1
7190  DIST = START
7200  DISTM = STARTR
7210  DISTD = STARTR
7220  NDIST = 0
7230  7010 M = M + 1
7240  IF(M.GT.MT) GO TO 7050
7250  DISTM = DISTM + MASTER(1,M)*SM
7260  PLOT(PM) = CB
7270  PM = MASTER(2,M)/2 + 1
7280  PLOT(PM) = CM
7290  PLOT(PD) = CD
7300  7015 IF(DISTM.LT.DIST) GO TO 7010
7310  IF(DISTD.GE.DIST) GO TO 7030
7320  7020 N = N + 1
7330  IF(N.GT.NT) GO TO 7060
7340  NDIST = NDIST + DATA(1,N)
7350  DISTD = STARTR + NDIST*DC
7360  IF(DISTD.LT.DIST) GO TO 7020
7370  PLOT(PD) = CB
7380  PD = (DATA(2,N)*SC)/2.0 + 1
7390  IF(PD.GT.51) PD = 52
7400  PLOT(PM) = CM
7410  PLOT(PD) = CD
7420  L = 1

7440  K = DATA(3,N+1)
7450  DISTE = DISTD - DCP 7470  7030 IF(DIST.GE.DISTE) L = K
7480  J = MAX0(PM,PD)
7490  IF(DIST=START) WRITE(KO,702) N
7500  X = DIST
7510  WRITE(KO,704) X,EV(L),(PLOT(I),I=1,J)
7520  DIST = DIST + SCALE
7530  IF(DIST.LT.FINISH) GO TO 7015
7540  7050 WRITE(KO,702) N
7550  GO TO 4000
```

FIG. 16

METHOD FOR AUTOMATED ANALYSIS OF VEHICLE PERFORMANCE

FIELD OF THE INVENTION

The present invention relates to a computer system for storing recorded data from vehicles such as locomotives, mine shaft cars, and other vehicles. A computer is programmed to compare the recorded data against a prescribed profile.

BRIEF DESCRIPTION OF THE PRIOR ART

A recorder system for recording vehicle data, such as speed, distance and operating event, is disclosed in U.S. Pat. No. 3,864,731, issued on Feb. 4, 1975 and U.S. Pat. No. 3,938,092 issued on Feb. 10, 1976. The recording apparatus disclosed is capable of acquiring data from vehicles, such as speed, distance, braking, and other events. The apparatus described is applicable to vehicles of all types including, but not limited to, locomotives. The referenced patent application is described in terms of a typical vehicle, such as a locomotive. In essence, the referenced patents are directed to the recording hardware, while the present specification is directed toward the processing of the recorded data to enable analysis of vehicle performance.

A brief description of the prior art is included in U.S. Pat. No. 3,864,731.

BRIEF DESCRIPTION OF THE PRESENT INVENTION

The recording of digital data in a suitable form holds the potential of conveying locomotive speed and related data into railroad computer systems.

The system being developed has the potential of enabling far greater flexibility than the previous analog strip chart systems. It will record speed, distance traveled, and events such as: throttle position, air and dynamic brake application or other measures of train performance. It also interfaces with a digital computer and thereby opens new dimensions of both recording and evaluating the operation of a particular train over a particular segment of a railroad. Utilization of the same approach is applicable in other vehicles as well. However, for purposes of convenience only, the remaining specification will be described in terms of locomotive.

Plug-in cartridges supplant the long, unwieldy strip chart rolls and will also enable transmitting the data into a railroad's telecommunications and computing system. It enables evaluation of train handling, speed and event exception reporting, and determination of conditions prior to train separations and derailments.

The sealed cartridges are equipped with magnetic tape in an endless loop and include the heads and all moving parts. The tape itself is reusable. It plugs into an electronic monitoring and recording unit on the locomotive which is connected to the speed and event sensors.

Once the information is recorded, the cartridge is simply removed from the recording unit on the locomotive and inserted into the "playback" unit. The playback unit either couples directly into a computer or into a computer terminal so that the information on the tape can be transmitted via the railroad's telecommunications system to a central computer. At the central computer the information will be stored as a part of the railroad's data system. The present invention will process the stored data as related to specific portions of a railroad line. Analysis and associated print-outs keyed to the needs of train performance can then be made by the computer, both as standard variance reports and/or as special reports produced upon request.

Three elements of data are recorded at set intervals of distance traveled, the speed, the distance traveled since the previous recording, and the event status.

As long as the train speed and event status remain constant, no information is "written" on the tape, but a count of the distance traveled since the last recording is maintained by the monitoring system. When a change in speed or event status occurs, a recording is made on the tape, and the new data is stored in the memory.

One event position is reserved for the recording of the "mark". The mark is a special purpose event which, for example, responds to a magnetic coil burried in the track bed. The location of the coil is stored as part of the master profile data and thus allows the recorded track data to be automatically aligned with the master data for analysis by actual mile post. All the necessary identifying information for each given stretch of track is maintained at the central computer.

When the data from a particular run is entered into the computer, it is given a reference name and stored on an appropriate storage device available to the computer.

The data can then be analyzed in a number of ways. Plots can be produced upon request through a keyboard entry system relating speed and event status between specific locations. Exception reports can be produced which show deviations from established operating standards.

BRIEF DESCRIPTION OF THE FIGURES

FIG. 1 is a block diagram illustrating the basic data processing system associated with the present invention.

FIG. 2 is an overall flow chart of the main program of the present invention.

FIG. 4 is a sample print-out of data, as processed by the main program of the present invention.

FIG. 5 is an overall flow chart of the analyze routine, in accordance with the present invention.

FIG. 6 is a flow chart of the routine for loading track data into the computer memory from auxiliary storage, where it is later processed in accordance with the present invention.

FIG. 7 is a routine for loading master data into the computer memory, for processing in accordance with the present invention.

FIG. 8-16 are the instructional source listings of the computer program steps, relating to the previously referred to flow diagrams.

DETAILED DESCRIPTION OF THE INVENTION

Figure 3:
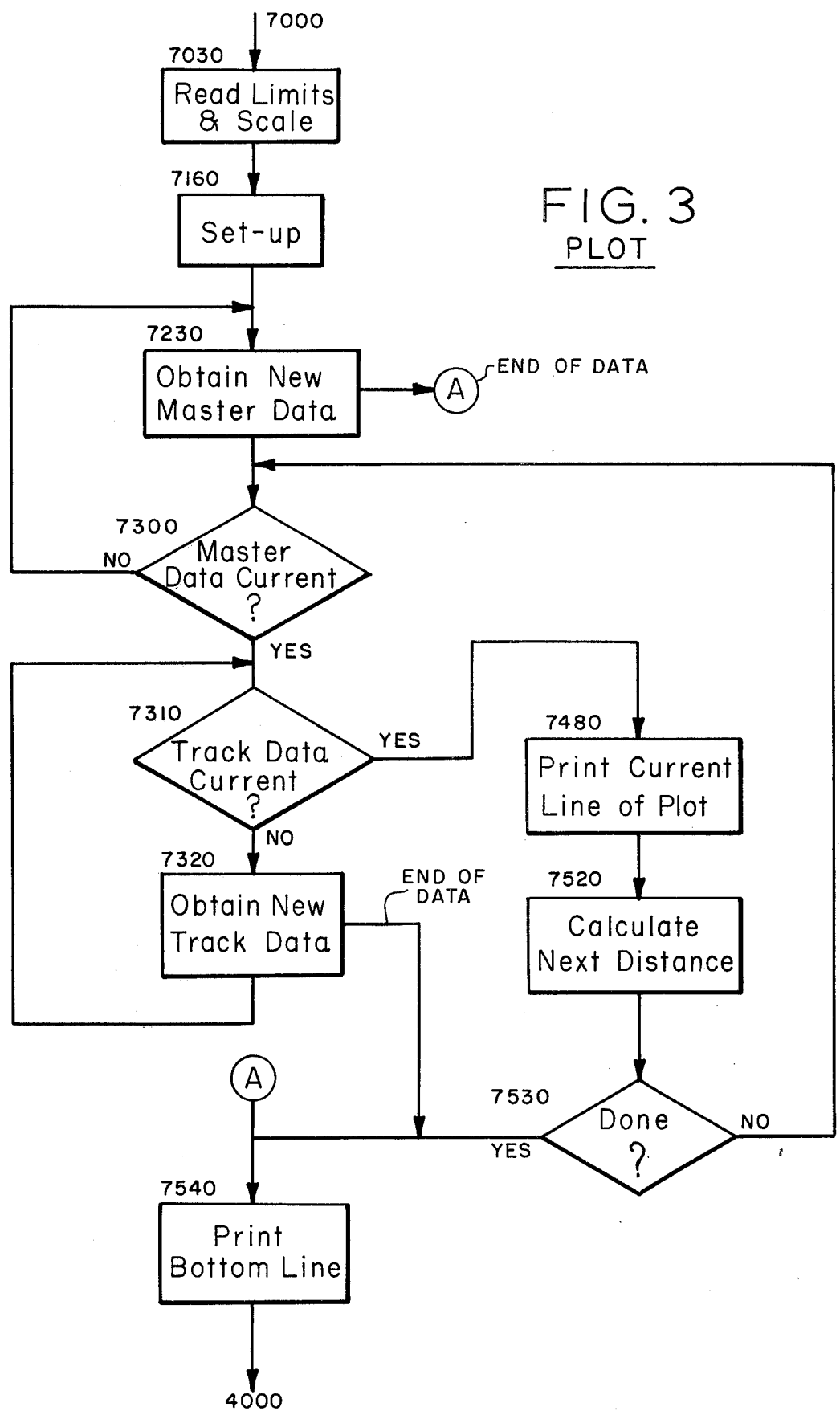
FIG. 3 is a flow chart of the plot routine of the present invention.

Referring to the figures, and more particularly FIG. 1 thereof, a block diagram is illustrated for the system of the present invention. An input-output terminal (10) will transmit recorded data to be stored in a disc file (12). Typically, the terminal (10) may be of the type manufactured by Computer Transceiver Systems, Inc. and known in the trade as the EXECUPORT-310 series. As previously explained in the brief description of the present invention, the playback unit reads the data recorded on board a vehicle (locomotive), and is coupled directly into the terminal (10). Other than the terminal identified above, other telecommunication terminals and systems may be employed to communicate with the computer.

The recorded track data is stored on the disc file (12) in a continuous stream of bytes (characters). In order for the transmitted data to be compatable with a general computer program, the track data undergoes conversion by a suitable program (14). By way of example only, an acceptable computer is any of the IBM 360/370 series. The convert program (14) as will be seen later on, is programmed in PL/I language. After the transmitted data has undergone conversion, it is stored as series of numerics in a new disc file (16). The main program (18), to be discussed hereinafter then processes the track data. In a typical utilization of the system shown in FIG. 1, the main program (18) compares the track data (16) with the master profile data (24). Master data, such as speed limits, required or restricted event intervals etc. is stored, in a disc file (20). A "loader" program (22), checks the master data for errors, converts the data to internal machine code and stores it in a disc file (24). The loader program is presently written in FORTRAN, as is the main program (18). The main program (18) provides for the analysis of the track data with respect to the master data. In response to various operator requests, several reports (26) may be printed out at the I/O terminal (10).

FIG. 2 illustrates the overall logic flow of the main program (18). The referance numerals next to the flow chart blocks correspond with the line numbers in the computer program source listing to be discussed later in greater detail.

Block 1000 *MAIN* initializes, and defines the variables and constants that are to be used throughout the program.

Block 2000 controls the loading of the track data into the memory from the external storage device. The data is then interpreted and prepared for processing.

Block 3000 similarly controls the loading of the master profile data into the memory from the external storage device, and similarly prepares the master data for processing.

Block 4000 is a decisional block which controls the overall operation of the main program.

After having loaded the initial track and master data files into the memory, the various processing options may then be selected by the operator. For ex. the operator may enter "end" to terminate the program or "off" to both terminate the program and disconnect the terminal from the communication line.

In Block 5000 the operator may select to "analyze" the data whereby the analyze routine will compare the recorded track data with the master profile data and print a report of any speed or event violations.

In Block 7000 the operator may elect to "plot" the data to obtain a graphical display of speed and events along with the speed limit as vs. the mile posts or distance traveled.

Another processing option (28) allows the operator to reload or replace the current track data and/or master data with a new set of data to be processed. (this contitutes a repeat of Block 2000 and 3000)

In Block 9000 the operator may elect to do a detailed examination of the data in memory.

The following discussion refers to the load track data routine (FIG. 6 Block 2000 of FIG. 2). The main function of this routine is to move the desired recorded track data from auxiliary storage into the memory and to prepare it for processing.

A decisional step (2001) allows bypassing of the load routine if the track data has already been loaded during a previous pass through the routine. If loading is required the first value on the file is read in (2003) to determine what type of file is being processed (2004). If the value is zero the file contains data previously processed by the main program and saved. If this is the case, a simple reload of the track data is performed (2006). If the first value on the file is non-zero the file contains raw data direct from the convert program and thus requires interpreting (2040) after having been read in (2011).

In either case the routine searches the file (2165) to locate the first two reference marks in the data which will be required to line up the data with the master profile and precisely define the distance represented by each recording, termed the data scale. The feature allows the program to process the data without having to know the vehicles wheel size.

After loading the track data file, the program proceeds to the load master data routine (FIG. 11 and Block 3000 of FIG. 2) which has the like function of moving the master profile data from auxiliary storage to the memory and preparing it for processing.

A decisional step (3040) likewise allows bypassing the loading routine if master data is already present from a previous pass through the routine. If a load operation is required, the data is read into memory (3050) and the first two master marks are located (3120).

Following the loading of both the track data and the master data the first two marks from each file are used to line up the track data with the master data (3350). The first marks of each file are used to provide an absolute reference point which located the recorded data with respect to the master profile. The second marks of each file are then used to establish the scale of the recorded data. Recorded track data may now be analyzed and plotted in reference to actual mile posts encountered during the trip.

The following discussion will be directed to a brief explanation of the analyze routine (FIGS. 4, 5 and Block 5000 of FIG. 2). The end result of the analyze routine is the table of violations such as the table shown as an example in FIG. 4 (29).

Each line of the table represents a single continuous speed violation and contains the necessary information to summarize the violation.

To illustrate; Line 1 of the table (39) indicates that the vehicle was in violation of the speed limit from mile post 42 to mile post 62, and that the maximum violation of 20 MPH over a limit of 60 MPH occurred at mile post 46.5.

Before performing the analysis the routine requests the speed voilation tolerance (34) which specifies the number of MPH by which the speed must exceed the speed limit before the overspeed is to be considered a violation. A reply of zero (36) specifies no tolerance. Upon completion of the analysis, the routine prints the total number of violations flagged (40) and the total number of miles covered while the vehicle was in violation (41).

If no violations were detected, the routine merely prints "no speed violations detected".

Referring now to the flow chart (FIG. 5) the routine requests and reads in the tolerance (5006) and initializes the variables used by the routine (5010).

The routine then compares the recorded data segment by segment against the master profile to build the table of violations.

A decisional step (5054) determines which data file must be advanced or "updated" in order to process the next segment of track. After updating either the track data (5058) of the master data (5020) the routine compares the speed against the speed limit (5330) and maintains the information to be printed in the violation table. When either file can no longer be advanced, an out of data condition exists and the routine is directed to print the summary (5570) and return control to Block 4000 for the next processing request.

The following discussion will be directed to a brief explanation of the plot routine (FIGS. 3, 4, and Block 7000 of FIG. 2).

The end result of each run of the plot routine is graphical representation of the speed, speed limit, and events status as versus distance or mile post such as in the sample plot in FIG. 4.

The routine requests the plot limits (42) which specify the starting and ending mile posts for the current plot and the plot scale (43) which specifies the plot resolution. The scale may be entered as a positive integer indicating lines per mile, or as a negative integer indicating miles per line, a value of zero is not allowed. The milepost (mp) for each line of the plot is indicated at the left of the page (46), followed by the event status (48) at that mile post. The event status is represented in this case by up to four characters each representing the presense of a particular event (50). To the right of the vertical boarder (52), the speed is represented by an asterick "*" (62) and the speed limit by a dollar sign "$" (60). The speed will override the speed limit if both characters happen to occupy the same print space (63).

The horizontal scale for the speed and speed limit is two MPH per print space, as indicated by the horizontal boarders (44 and 55).

Referring now to the flow chart (FIG. 3) the routine requests and reads in the limits and scale (7030) and then sets up the variables to be used by the routine such as the initial mile post (7160). The master file is advanced to obtain the new speed limit (7332). The master distance is compared with the current plot distance to determine if the master data applies to current mile post (7300) and if not, the master file is further advanced (7320).

When the master file has been sufficiently advanced a similar operation is performed on the track data file (7310 and 7320). If an attempt is made to advance either file beyond its end point, the routine is terminated (7540). After the requried information is located, the current line of plot is printed out (7480). The distance value of the next line is calculated (7520) and a check is made to determine if this distance exceeds the final distance (7530) in which case the plot request has been satisfied and the routine is terminated (7540). If the request was not satisfied, the routine proceeds to obtain the information for the new current mile post (7300).

The "detail" rountine (Block 9000 FIG. 2) contains a number of smaller routines which provide specialized data processing options and aid in program and hardward checkout and verification. Since these routines are mostly custom designed modules and/or non-essential to the rest of the program, they will not be further discussed.

The following discussion pertains to a brief description of the convert program (FIG. 7) which provides a software interface between the hardware and the main program.

The main function of the convert program is to perform a code and data format conversion on the raw transmitted track data to make it compatable with the standard data form acceptable to the main program.

The conversion is accomplished by converting each of the 8 bit ASCII input characters to a corresponding numerical integer value and then uses a "look up table" technique to derive the corresponding output value. Invalid input characters are converted to an output value of $-1$. Thus widely varying input codes and data formats may be easily accommodated by the main program by merely employing a different conversion table and/or a slightly different version of the convert program.

EXPLANATION OF THE PROGRAM LISTINGS

The following discussions pertain to the program source listing (FIG. 8 et seq) which present the instructional steps necessary to implement the afore mentioned processing routines in a digital computer. The numbers in the flow charts correspond with the line numbers in the left column of the listings.

The listing of the convert program (FIG. 12), written in the standard PL/1 computer language, will be discussed first:

Line 100

CONVERT: PROCEDURE:
defines the beginning of the program or procedure and establishes its name as "Convert".

Lines 110 through 170

DECLARE CONVTABLE ENVIRONMENT (LINE) INPUT, (TAPUNF, DATAFILE) ENV (INTERNAL), BYTE (0:0) CHAR (1), CHUNK CHAR (18), TABLINDX (0:0) FIXED (9), FILL CHAR (3), TUFLCHAR CHAR (1), TABLE (0:2555) FIXED (9), (SUBSCRPT, VALUE, POSITION) FIXED (9), SOURCE, DESTIN) CHARACTER (8);
Serve to define the various variables and constants to be used throughout the program, declaring their storage requirements and the type and length of data they are to contain.

Line 180

ON ENDFILE (TAPUNF) GO TO ENDUP;
Statement instructs the program to transfer control to the statements following the label "endup" when an attempt is made to read beyond the end of the "tapunf" (input) file. This condition will occur immediately after all the input data has been processed.

Line 190

ON ERROR GO TO FETCH;
Statement instructs the program to transfer control to the statement following the label "fetch". If at any time the program encounters an error condition. The actual start of the program occurs at Line 200

FETCH: K=0;

Here "fetch" is a label used by the "on error" statement for transfering control after an error has occurred. K=0 resets character count to zero.

Line 220

/* OPEN INPUT FILE (TAPUNF) */
is a comment line describing the function of the four succeeding Lines 230 through 260. The input file is identified as "tapunf".

Line 230

PUT LIST (INPUT FILE);
causes the printing of the message "input file" on the terminal printer.

Line 240

GET FILE (SYSIN) LIST (SOURCE);
causes the printing of a question mark (?) on the printer after which the program waits for the operator's resonse. The operator enter's the file name via the keyboard and it is stored in the variable "source".

Line 250

PUT FILE (SYSPRINT) LIST (SOURCE); p1 instructs the program to echo the keyboard entry onto the printer, to verify that the correct file name was received.

Line 260

OPEN FILE (TAPUNF) TITLE (SOURCE) INPUT;
attempts to establish a link between the program and the external storage device containing the requested data file and prepare the file for processing. Failure to establish this link will raise the error condition.

Line 280

/* OPEN OUTPUT FILE (DATAFILE) */
is a comment line similar to that of Line 220. The output file is to identified as "DATAFILE".

Line 290

PUT SKIP (2) LIST (OUTPUT FILE):
causes the paper in the printer to be advanced 2 lines and the message "OUTPUT FILE" to be printed.

Line 300

GET FILE (SYSIN) LIST (DESTIN);
requests the keyboard entry of the destination for the output from the CONVERT program. The output file name is stored in the variable "destin". This file (16) will receive the converted data after processing by the CONVERT program.

Line 305

IF DESTIN="THEN DESTIN='SYSPRINT';
is a conditional step such that if no file name was entered via the keyboard, the output will be assigned to the system printer, in this case the terminal. This option will permit a visual inspection of the converted data which is particularly desirable to debug or verify system operation.

Line 310

PUT FILE (SYSPRINT) LIST (DESTIN);
causes the echoing of the keyboard entry for verification of the output file name.

Line 320

IF DESTIN='SYSPRINT' THEN PUT SKIP; ELSE
is a conditional step such that if the output destination is to be the system printer, then the printer paper is to be set to the beginning of a new line otherwise (else), the following step is to be performed.

Line 330

OPEN FILE (DATAFILE) TITLE (DESTIN) OUTPUT;
attempts to establish a second link with the storage device, this time for the output file. Again the error condition will be raised if the attempt fails.

Line 350

/* ASSIGN TABLE DEFAULT VALUE */ TABLE=−1;
is partially a comment indicating that the statement "table = −1", is setting all 256 rows of the table to an initial value of −1.

Line 360

TABLINDX (1)=0;
assigns a value of zero to the first element of tablindx.

Line 380

/* LOAD CONVERSION TABLE */
is a comment describing the next task to be performed, namely loading the conversion table values into memory. The table consists of two columns. The left column will be the numerical representation of the input data character while the right column is the numerical representation of the corresponding output data value.

Line 390

OPEN FILE (CONVTABL);
establishes a third link with storage to prepare the conversion table for processing.

Line 400

ON ENDFILE (CONVTABL) TO TO ENDLOAD;
establishes that when the end of the conversion table is detected, the program is to continue processing at the label"endload".

Line 410

READ: GET FILE (CONVTABL) LIST (SUBSCRPT, VALUE);
causes two values to be read from the storage device and placed in the memory at locations "subscrpt" and "value".

Line 420

TABLE (SUBSCRPT)=VALUE; GO TO READ;
enters the "value" into the table at the line determined by the variable "subscrpt". Any lines in the table not so modified will retain their initial value of −1, indicating an unassigned conversion pair. The "go to read" transfers control to the label "read" in order that the next data pair be processed.

Line 430

ENDLOAD: IF DESTIN="SYSPRINT" THEN GO TO LISTFILE;

tests the desired destination for the output data and transfers control to the label "listfile" if printer output was requested, otherwise processing is to continue with the next instruction in sequence.

Line 450

/* CONVERT FILE */
is a comment line indicating the function of the following statements.

Line 460

LOOP: GET FILE (TAPUNF) LIST (CHUNK);
establishes the label "loop" and causes the next group of eighteen characters to be read in from storage and placed in the variable "chunk" in preparation for conversion.

Line 470

DO POSITION=1 to 18;
causes the program to repeat a number of the succeeding steps, once for each of the 18 characters in the variable "chunk".

Line 480

TUFLCHAR=BYTE (POSITION);
assigns one of the 18 characters (as determined by the value of the variable "position") to the variable "Tuflchar" for temporary storage, thus creating a full word numeric (from the single byte character from "chunk") for use as an index into the conversion table.

Line 490

PUT FILE (DATAFILE) LIST (TABLE) (TABLINDX (1);
causes the value in the conversion table, as determined by the value of the table index to be recorded on the external storage device. To repeat, Lines 480 and 490 are executed repeatedly, once for each of the 18 characters in the "chunk" as specified by the DO statement. The variable K will maintain a count of the number of such chunks that have been processed.

Line 500

END; K=K+1; GO TO LOOP;
The "end" statement terminates the range of the preceding "DO" statement. K=K+1 increments the character count, and the "go to loop" transfers control to the label "loop" to process the next "chunk" of data.
Line 520 through 570 perform the same function of data conversion as Lines 450-500 only in this case the output is directed to the printer rather than an external storage device.

Line 590

/* EXIT */
is a comment line to indicate the function of the last four lines of the program.

Line 600

ENDUP: K=K*18;
establishes the label "endup" for the endfile statement and calculates a new value for K, equal to the number of chunks times the number of characters per chunk (18) thus arriving at the total number of characters processed which in the current application may be as large as 30,000.

Line 610

PUT SKIP (2) LIST (K, 'CHARACTERS LOADS'):
causes the paper to be advanced and the value of K to be printed followed by the message "characters loaded".

Line 620

CLOSE FILE (CONVTABL), FILE (DATAFILE), FILE (TAPUNF);
serves to release the established links with the storage devices containing the three files.

Line 630

END CONVERT;
signifies the end of the program and informs the compiler that there are no further instructions to be considered.

As a result of the conversion procedure, the input data has been code converted and re-formatted, the input having been a series of 8 bit characters and the result being series of four byte integer numberics which can then be operated on in conjunction with a conventional computer language. The conversion table has provided the one to one translation or conversion from the input code to the desired output code which will facilitate the further processing of the data by, in this case, the "Main" program.

As FIG. 1 illustrates, the converted track data (16) is operated upon by the main program (18) in conjunction with the master profile data (24). The track data file (16) contains the recorded distance, speed and event code information which must be arranged in a logical array in memory. Then the main program must process the data to produce the various plots and reports. The instructional source listings for the main program are found in FIGS. 8 through 16. FIG. 2 shows the overall flow chart of the MAIN program.

FIGS. 9 and 10 contain the setup and major control functions of the Main program.

Line 1020

INTEGER *2 TAPE (30000), DATA (3,10000), TM/30000 NT/10000/,%
The term "INTEGER *2" specifies that 2 bytes (one half-word) of storage is to be reserved for each of the variables named. The first variable defined is TAPE, with 30000 elements. Thus 30,000 half words are provided for in storage to receive the data read from the input file 16 (FIG. 1). The variable "DATA" is to be a 2 dimensional array 10,000 lines long and three columns wide representing distance, speed and event code, respectively. The variable "TM' is to have the value of 30,000 and signifies the maximum number of input characters allowed for in storage. Likewise, NT specifies the maximum number of data records allow for. The '9'. throughout will indicate that the program statement is continued on the following line.

Line 1030

Is a continuation of the previous line and similarly sets up storage for the master data profile from 24 (FIG. 1). Master data similarly has the three columns containing distance, speed and events. MTM (=500) signifies the maximum number of master records allowed for in storage.

Line 1040

INTEGER *4 KI /5/, KO /6/, KD /7/, KM /8/

This statement defines the input/output units to be used by the program, the units for the present program are as follows:

KI/5/—Operator Data Entry (Keyboard)
KO/6/—Output (Printer)
KD/7/—Data (Disc)
KM/8/—Master (Disc)

Lines 1050, 1060, 1070

INTEGER *2
E1(16)/0,1,0,1,0,1,0,1,0,1,0,1,0,1,0,1/,%
E3
(16)/0,0,1,1,0,0,1,1,0,0,1,1,0,0,1,1,/,E5D(16)/8*0,8*1-/,%
E4 (16/4*0,4*1,4*0,4*1/,E5(16)/8*0,1,2,1,2,1,2,1,2/ set up tables to facilitate the accessing of the event code. The event code is comprise of four binary bits, for a total of 16 possible binary combinations. E1 will permit us to access the lowest binary bit of the event code as will be shown later. Tha alternating binary 0 and 1 of E1 indicate the fact that the least significant bit in the event code will alternately vary between binary 0 and binary 1, as the event code varies between the sixteen possible states.

Lines 1072 and 1073

INTEGER *4
EV(16)/' ',' P','M','M P',' T',' PT','M T','M PT',%
' D',' DP','MD','MDP',' D T',' DPT','MD T','MDPT'/ set up a table of 'EV' which is to have 16 members, each of which is four characters (one for each event) long. The table provides a character representation for all 16 possible combinations of the four events in this case power, dynamic braking, mark and regular train braking. The concept here is to print out the appropriate character when a corresponding bit position in the event code is a binary 1. Thus, the various combinations of the events, from the non-occurrence of a event to the occurrence of all four, events are defined.

Line 1075

INTEGER *2 PLOT (53)/53*' '/,CM/'$'/,CD/'*'/,CB/' '/

This statement provides storage for a 53 position plot buffer, (The notation 53*' '/ indicates that all 53 positions are initially set to blanks). It further defines three variables containing the characters "$" "*" and a blank to be used in the plotting routine.

Line 1080

INTEGER *4 EC,FLAG,PM/1/,PD/1,MS/1/, SPDCHK, TMAX merely sets up storage for the miscellaneous variables named.

Lines 1090 and 1092

INTEGER *2
YES/'Y'/,NO/'N'/,A/'A'/,P/'P'/,D/'D'/,E/-'E'/,R/'R',%
REPLY,U/'U'/,O/-'O'/,MC/'M'/,C/'C'/,S/'S'/,XC/'X'/LM/,'L'/ initialize the character variables which are to be used to decypher the responses from the keyboard. By way of example, the variable 'YES' has the character value of 'Y'.

Line 1100

REAL *8 REPLY8 (2), NULL/' '/, REPLY9 (2)

reserves storage for the 16 character file names to be used later and assigns a value of all blanks to the variable 'NULL'.

Line 1110

EQUIVALENCE (DATA(1,1), TAPE (1))

creates an equivalence or overlay between the raw data array (TAPE) and the interpreted DATA array to conserve storage.

Line 1510

"* OPEN FILES *"
is merely a comment.

Line 1520

1500 WRITE (KO, 120)
establishes the label '1500' and initiates the printing of format 120 on the device previously defined by the variable KO (the terminal printer) thus prompting the operator to enter the 'Input File Name' in the next step.

Line 1530

READ (KI, 108) REPLY9
requests the reading of the input file name from the device defined by the variable KI (terminal keyboard) under the control of format 108. The reply is to be stored in the variable 'REPLY9'.

Line 1540

IF (REPLY9 (1).NE.NULL)CALL OPEN (KD, REPLY9,'INPUT')
is a conditional step such that if the previous response was not equal to the null response, an attempt is made to locate and prepare the input file for later processing.

Lines 1550 through 1570 perform a similar function for the master file.

Lines 4001-4090 comprise a functional group of steps which requests from the operator the type of processing to be performed and then causes the appropriate routines to be executed to satisfy the request.

Line 4010

4000 WRITE (KO, 400)
initiates the printing of format 400, to prepare the operator for the response to be made in the next step.

Line 4020

4001 READ (KI, 101) REPLY
establishes the label 4001 and initiates the reading of the operator's response from the keyboard under the control of format 101. The first character of the response is stored in the variable 'REPLY' which is then compared against each of the valid responses (in lines 4030 thru 4075) to determine what action is to be taken next.

If a match cannot be found, the program proceeds to;

Line 4080

WRITE (KO, 404)

which initiates the printing of format 404 instructing the operator that he has made an invalid response.

Then Line 4090—Go to 4001 returns control to statement label 4001 (Line 4020).

Thus, an iterative loop has been established at this point which maintains control until a valid 'REPLY' has been received.

Lines 99101 through 99999, in FIG. 14, contain the I/O format statements which are utilized by all input/output operations to facilitate the transfer of all data (messages, responses, plots, analysis, etc.). Between the program and the terminal device. The individual format statement will be referred to throughout the program discussion.

Line 99999 END indicates the end of the program statements.

Upon establishing a match between the operator's 'REPLY' and one of standard program options in lines 4030 through 4075 a branch is made to the appropriate point in the program where the routines are located to handle the operator's request. These various routines will now be discussed. A request to 'END' the program causes control to be transferred to statement 9999 (Line 99003) where a program 'STOP' instruction is executed. The computer system will than be available to perform any of its other functions. A request of 'OFF' causes transfer of control to statement 9998 (Line 99002) where a call to the system communicator is made requesting that the communication line be turned off and all system functions released. Upon request for reload (or upon the first iteration of the program) control is transferred to statement 1500 (Line 1520) as previously discussed and then to the LOAD DATA routine. These particular steps pertain to block 2000 in FIG. 2 and the flow chart of FIG. 9. The purpose of these steps is to transfer the input data from the external storage device into memory and to prepare the data for processing.

Line 2001

IF (REPLY9 (1)=NULL) GO TO 2910 allows bypassing the track data input routine if the operator entered a null response for the input file name. This is accomplished by transferring control to statement 2910 (Line 2160). A null response is valid only for a reload operation where only the master data is to be changed.

At Line 2002

WRITE (KO, 210)

a message is printed at the terminal (format 210) which indicates to the operator that the loading of the file has commenced. At this point, two types of data files may be read into memory, one containing raw data from the convert program requiring further interpreting, and the other containing data saved from a previous run of the main program requiring no interpreting. The first value on the file determines which type of file is being processed.

Line 2003

READ (KI) NSS obtains the first value from the file and stores it at the variable NSS.

Line 2004

IF (NSS 0) GO TO 2000 tests the first value on the file for a negative value signifying that the file contains raw data and requires additional processing. If true, control is transferred to statement 2000 (line 2011). If false control passes to the next statement in sequence.

Line 2006

READ (KD) NT, (( DATA (I,J,), J=NSS, NT), I=1,3)

causes the transfer of the pre-interpreted data into memory from the storage device.

Line 2008

WRITE (KO, 204) NULL causes the message 'LOADED' to be printed thus indicating the completion of the load operation.

Line 2009

GO TO 2910 control is transferred to statement 2910, (Line 2160) in order to bypass the alternate file loading routine which follows.

Lines 2011 and 2012

2000 DO 2001 I=1, TM
2001 READ (KD, END=2003) TAPE (I)

together cause the transfer of raw data (output from convert) into memory from the external storage device. The 'END-2003' causes control to be transferred to statement 2003 (Line 2016) upon detection of the end-of-file condition.

Line 2014

WRITE (KO, 121) TM causes the printing of an error message if the maximum number of input values (variable TM) have been read without having encountered the end of file thus indicating that the file size exceeds the reserved memory capacity.

Line 2018

TMAX=I−1 sets the variable 'TMAX' equal to the number of values actually loaded.

Line 2026

WRITE (KO, 201) TMAX then displays the total number of values read in (TMAX) followed by the message 'LOADED' (Format 201).

Line 2038

"* REFORMAT DATA *"

is a comment indicating the beginning of the routine which will interpret the data and further prepare it for processing by the other routines. See the flow chart of FIG. 11.

Line 2040 thru 2058 assign initial values to certain variables to be used by the routine.

In Line 2056, the distance counter is set to zero.

Line 2060

"* START *"

is a comment indicating the start of the iterative loop which will interpret the string of input data numerics (characters) and produce the 3×N array containing the recorded distance, speed and event information to be used by the remainder of the program.

Line 2062 establishes the iterative 'DO' loop through statement 2900 (Line 2150). The intervening instructions are to be performed once for each input datum excluding the first two.

At Line 2064 the $i^{th}$ value of the input data stream is temporarily stored in the variable K, and checked at line 2066 for a negative value which would indicate an invalid input value and thus transfer control to statement 2510.

Line 2068 establishes statement label 2505 and transfers control to 1 of the 3 statements 2600, 2700 or 2800 depending on the current value of 'L' (ie: IF L=1 control goes to statement 2600). The value of L determines which of the three types of data (distance, speed or events) is currently being expected by the program.

Line 2070 thru 2076 receive control from Line 2066 whenever an invalid input value has been detected. Line 2070 establishes statement label 2510 and assigns the invalid input the default value of zero. Invalid input could have occurred upon a data transmission error or other hardware failure.

Line 2074 indicates to the operator by way of the printer that the $i^{th}$ character of input data was found to be invalid. Line 2076 transfers control to statement 2505 to continue processing.

Line 2084 thru 2104 comprise a routine which interprets the distance character which is comprised of 5 bits of distance information, a forward/reverse bit, and the fourth event bit.

Line 2086 (statement 2600) checks for the presence of the reverse state in the forward/reverse bit and transfers control to statement 2601 when it is not found. If the reverse state is found, Line 2088 removes its binary weight of 64 from the distance value and Line 2090 places a negative sign on the appropriate distance value.

Line 2092 (statement 2601) checks for the presence of the fourth event bit and if not found transfers control to statement 2602. If the fourth event is present, Line 2094 subtracts its binary weight of 32 from the distance value and Line 2096 updates the appropriate event value in the data array. At this point all that remains in the variable K is the five bits of distance information which is stored in the current record of the data array in Line 2098 (statement 2602).

Line 2100 maintains the count of recording intervals processed in the variable 'IDIST'.

Line 2102 sets the value of L to indicate that an event character (column 3) is to be processed next. Finally Line 2104 transfers control to statement 2900 to advance to the next input character.

Lines 2106 thru 2114 comprise the steps necessary to handle a speed character. Since the speed character contains only speed in formation, its value is merely assigned to the second column of the current data record in Line 2108. The value of 'L' is set to 1 in Line 2110 to indicate that a distance character is to be processed next. In Line 2112 the current record number is decremented since the current record has been completed, and in Line 2114, control is transferred to satement 2900 to process the next character.

Line 2116 through 2148 comprise a routine which interprets event characters and checks data integrity. The event character contains the first three event bits and a fixed pattern of 1's and zeros. Failure to detect the fixed pattern is termed a 'SYNC' error. This condition arises when the program routine is not in synchronization with the data ie: a distance character appears where an event character is expected. The variable 'ISE' maintains a count of such errors in Line 2144 and the data interpretation loop is terminated if this count exceeds a value of 50 in Line 2146 otherwise the event code is assigned a default value of 1 in Line 2148.

Line 2150 (statement 2900) receives control after each character has been processed by one of the three routines above, and as indicated by the comment in Line 2152, is the last statement in the interpreting loop. Here the character pointer is decremented and control is returned to Line 2062 until all of the characters in memory have been processed. After all characters have been processed or the syne error limit has been exceeded, control passes to Line 2154 which merely establishes statement Label 2905.

Line 2156 prints out the number of 'SYNC' errors if the error count (ISE) has a non-zero value.

Line 2158 sets a pointer to the beginning of valid data in the data array. Thus NSS will point to the first valid data record in memory.

Line 2160 establishes statement label 2910 and temporarily sets a pointer for the first mark equal to the beginning of data.

Lines 2165 thru 2200 comprise a routine to search the data array for marks so that the recorded data may then be aligned with the master profile data.

Lines 2165 thru 2170 assign various initial values as required.

Line 2172 establishes an iterative loop through statement 2930 (Line 2194) to examine each data record for the existance of a mark.

Line 2174 transfers control to statement 2930 if the current record does not contain a mark. If a mark does exist Line 2175 examines the previous record to see if it also contained a mark. If so, the mark is not the first mark of a consecutive series of marks and it is therefore ignored by transferring control to statement 2930 to advance the loop to the next record.

Line 2176, the value of J is examined to determine if the mark just found is the first or subsequent mark in the data. If it is the first mark (J 1) , Line 2178 sets a pointer (NS) to record its location, Line 2180 stores the current distance in the variable 'NDISTM', Line 2182 sets J to indicate that the first mark has been processed and Line 2184 transfers control to statement 2930 to advance to the next record. If the mark just found was not the first mark, Line 2176 will transfer control to Line 2186 where a determination is made as to whether the mark is the second or subsequent mark. If the second mark has already been processed (J=2) control is transferred to statement 2930 as before, otherwise Line 2188 calculates the distance between the first two marks by subtracting the distance at the first mark (NDISTM) from the current distance (NDIST) and storing the result in the variable 'NDISTM', Line 2190 stores the location of the second mark in NM2 and Line 2192 sets the value of J to indicate that the second mark has also been processed.

Line 2194 (the last step in the iterative loop started at Line 2172) maintains the count of the relative distance traveled since the beginning of valid data.

At Line 2196 if fewer than two marks were found, a warning message (format 261) is printed.

At Line 2198 the approximate distance covered by the recording is calculated as: the number of recording units divided by the estimated number of recording units per mile.

Line 2200 prints out the result of the previous calculation to indicate the 'approximate distance covered'. After having loaded the track data, the program proceeds to load the master profile data in Lines 3000 thru 3330, as indicated by the comment at Line 3020.

In Line 3030, the variable SM is set to 1/100 which is the scaling factor for the Master File.

At Line 3040 a determination is made as to whether or not a new master file is to be loaded. If not (the reply in Line 1560 was a null or all blanks) control goes to statement 3200 (Line 3350).

If a master is to be loaded,

Lines 3050 through 3290 are executed.

Line 3050 causes the message 'LOADING' to be printed to indicate that the routine has been entered.

Line 3060 sets the value of the variable 'J' equal to zero. Here 'J' will again indicate whether the first, second, or subsequent mark is being dealt with.

Line 3070 sets the master record number to 1. Line 3080 sets the distance counter MDIST equal to zero. MDIST will accumulate the number of 100$^{ths}$ of a mile covered relative to the first record.

Line 3090 establishes statement label 3010 and reads one line of the master file from storage into memory. The data is stored in record M of the variable 'MASTER' and consists of 3 elements: distance (in 100$^{ths}$), speed and an event code. The 'END=3030' notation causes control to transfer to statement 3030 upon reaching the end of the file.

Line 3100 and 3110 causes records with negative event codes to be ignored.

Line 3120, determines whether the current record contains a mark within its event code. This is achieved by adding 1 to the event code (MASTER (3,M) and using the resultant value as an index into the E4 table defined in Line 1070. If the resultant value in the table is a 1 then the mark is present. If the table value is zero the mark is not present and control goes to statement 3020 to advance to the next record.

If a mark is detected, Line 3130 determines whether it is the first or subsequent mark. For the first mark Lines 3140 through 3180 are executed. Line 3140 sets MS to point to the current record to locate the first mark. Line 3150 sets the value of J equal to 1 to indicate that the first mark has been processed. Line 3160 stores the current distance count in the variable 'MDISTM' for later use.

Line 3170 calculates the mile post (distance) at the mark by multiplying the current distance count in 100$^{ths}$ of a mile by the scale factor 0.01 and storing the resultant mileage in the variable starter.

Line 3180 transfers control to statement 3020 to advance to the next record.

Line 3190 establishes statement label 3015 and determines whether the mark just found is the second or subsequent mark. If the second mark has been processed, control goes to statement 3020 to advance to the next record, otherwise Line 3200 sets the value of J to indicate that the second mark has now been found. Line 3210 calculates the relative distance between the two marks by subtracting the distance count at the first mark from the current distance count and storing the result in the variable 'MDISTM'.

Line 3220 (statement label 3020) maintains the distance count by adding the distance of the current record (MASTER (1,M) to the previous count.

Line 3230 increments the record number.

Line 3240 checks to see whether the next record will fit within the area reserved for the master in Line 1030 and if so transfers control to statement 3010 to read the record. If the next record number exceeds the maximum record number (MTM), the next instruction in sequence, Line 3245, prints a message indicating the master input file capacity has been exceeded.

Under normal conditions Line 3250 (statement 3030) receives control from Line 3090 when end of file has been encountered and sets the value of 'MT' to point to the last valid master record in the memory.

Line 3260 prints out the number of master records which have been 'LOADED'.

Line 3270 prints out a warning message if at least two marks have not been found.

Line 3290 calls a service routine to close the master file and release the external storage device from the program.

Lines 3350 through 3400 use certain values which have been previously derived to calculate a scale factor for the recorded data, as indicated by the comment at Line 3340.

In Line 3350 (Statement 3200) the speed constant is set to 1.

Line 3360 assigns an initial value of zero to the scale factor or distance constant (DC).

If the number of recording units between the first two marks in the recorded data is non-zero, Line 3370 calculates a new value for the scale factor by multiplying the distance count between the first two marks in the master data by the scale factor for the master and then dividing by the number of recording units between marks in the recorded data to arrive at the distance represented by each recording unit (DC).

If the scale factor still has a value of zero at Line 3380, a default value of 0.05 is assigned so that processing can continue. The sign of 'DC' is selected to match the sign of the total number of recording units in the Data File such that when the two values are multiplied, a positive distance results.

Line 3390 calculates this total trip distance and stores it in 'Dist'.

Line 3400 prints out the total trip distance covered by the recording and the scale factor to be used by the remainder of the program.

Finally, Line 3410 assigns the absolute value of 'DC' to 'DCP'. This concludes the routine for loading the recorded data and the associated master profile data into memory from storage. The data is now ready for processing by the remaining routines in the program.

Line members in the 5000's comprise the analyze routine (FIG. 5) which creates the exception reports by comparing the recorded data against the master profile data.

Line 5006, causes a message to be printed out under format 500, which prompts the operator to enter the speed violation tolerance (in mph) as requested by the read instruction at Line 5008. This value determines by how much the actual speed must exceed the speed limit before the violation is to be included in the report. The value is stored in the variable MTOL.

Lines 5010 through 5052 accomplish the initialization of a number of variables to be used in the remainder of the routine.

Line 5030 causes the report header to be printed. The variable 'distd' holds the value of the distance at which the current data record is no longer applicable. Likewise 'distm' is the distance at which the current master record is no longer applicable.

Line 5054 determines which of these two distances occurs first to determine which of the two records (master or data) requires updating next. If the data distance is greater than or equal to the master distance, control goes to 5030 otherwise Lines 5058 through 5109 are executed to update the current data information.

In Line 5060 the status of the flag is checked to determine whether the previous record has been completely processed and if so, the next record is processed.

Line 5062 increments the record number.

Line 5064 checks to see whether the resulting record number is within the range of stored data and if not transfers control to statement 5090 to terminate the analysis routine.

Line 5066 maintains the count of the number of recording units encountered since the first mark.

Line 5068 calculates the actual speed by multiplying the recorded speed by the speed scale (in this case by 1). For any record of data, the event code applies only to the last recording unit of that record. Thus if a record represents more than one recording unit and also contains an event it must be processed twice, once for the last recording unit containing the event and once for the remainder of the record without the event.

Line 5070 checks the status of the event code.

If an event is present, Line 5072 determines whether the record represents more than one recording unit and thus requires double processing.

If so, Line 5074 sets the 'flag' to indicate this fact, and Line 5076 subtracts one unit from the distance counter to allow for the last recording unit of the record which contains the event.

Line 5078 sets the current event code to indicate no events.

Line 5082 calculates the current data distance (mile post) by adding the product of the recording unit count (NDIST) and the data scale (DC) to the distance at the start of the run.

Line 5084 then checks to see if this new value for distance is greater than the previous distance and if not, control goes to statement 5020 to further advance the data.

Otherwise, Line 5086 sets the last distance equal to the current distance and

Line 5088 gives control to statement 5060 to analyze the speed.

Line 5090 receives control when the last unit in the record is being processed and indicates this fact by clearing the 'flag'.

Line 5092 then replaces the unit count which was temporarily removed in Line 5076.

Line 5094 assigns the current value of the event code to the variable 'EC'.

Line 5098 maintains a count of the number of recording units during which the brakes where applied (more generally when bit 4 is a one).

The remaining lines 5099 thru 5109 in FIG. 18 comprise a routine which serves as an example of possible event violation detection and reporting.

Line 5100 compares the value of the previous brake status (LEC) with the current status of the brake. If there was no change, control goes to statement 5026 where the current brake status is assigned to 'LEC'. Statement 5005 gets control when the brakes are first applied and stores the current distance in the junk variable 'z' statement 5007 receives control when the brakes are released and checks the current master event code to see if the brakes are being restricted.

If they are restricted, Line 5107 prints out the violation message along with the mile posts at which they were released.

Lines 5120–5180 advance the master file as required.

Line 5130 increments the record number.

Line 5140 checks to see whether the record is within the file and if not control goes to statement 5090 to terminate the routine.

Line 5150 calculates the new master distance.

Line 5160 stores the speed 'limit' and

Line 5170 stores the event code.

In Line 5180 if there was no change in the event code, ie the next master event code (NMEC) is equal to the last master event code (LMEC). Control is transferred to statement 5059 where the value of 'LMEC' is set equal to NMEC.

If there was a change in the event code, Lines 5190 through 5920 are executed. These lines serve as a second example of possible event violation detection and reporting.

Line 5200 determines whether the change occurred in the fourth master event bit, which in this example is set to a 1 to indicate that dynamic brakes are required for this particular distance interval. If this was not the bit that changed, control goes to statement 5036 where one of the other bits in the event code may be examined. If the fourth bit was a zero and is now a 1, the vehicle is entering a required brake region and Lines 5210 through 5240 are executed.

In Line 5210 the count of the number of recording intervals is reset to zero.

Line 5220 sets the count to one if the vehicle currently has the brakes applied.

In Line 5230 a variable is set to remember the mile post at the beginning of the region and Line 5240 transfers control to the next event check. If the fourth bit was a one and is now a zero then the vehicle has just left a required brake region and Lines 5250 through 5270 are executed.

Line 5250 calculates a value for the variable 'X' which is the ratio of the distance that the brakes were applied to the distance that they were required.

Line 5260 checks this ratio against a predetermined minimum value and transfers control to the next event check if the requirement was satisfied. If the requirement was not satisfied, ie brakes were required for at least 50% of the region and were only applied for say 10%, the violation is flagged in Line 5270, by printing out the first and final mile posts for the region and the fraction of the region that the brakes were actually applied.

As indicated by the comment in Line 5280, other such event examination routines may be inserted at this point as required by the user.

The remaining lines 5320 through 5640 comprise the routine which compares the vehicle speed with the speed limit and prints any overspeed violations in the report.

In Line 5330, the starting distance of the current segment is set equal to the final distance of the previous segment and the final distance for the current segment is set to the lessor of the two variables 'DISTD' and 'DISTM' which are the distances at which the current track and master records are no longer applicable.

Line 5350 then determines whether the speed exceeds the speed limit by more than the value of the tolerance and if so, Lines 5360 through 5430 are executed. Otherwise, control goes to Line 5440.

Line 5360 sets the value of 'ISV' to indicate that the speed limit is currently being violated.

Line 5370 sets the value of 'BDIST' (the milepost at the beginning of the violation) equal to the current segment distance if the vehicle has just gone into violation.

Line 5380 determines the magnitude of the overspeed.

In Line 5390 the current overspeed is checked against the maximum overspeed of the current violation and if it exceeds the previous maximum, lines 5400 and 5430 are executed.

Line 5410 sets the value of the maximum violation equal to that of the current violation, Line 5410 stores the limit at the maximum violation in 'MLIMIT'.

Line 5420 calculates the approximate mile post for the maximum violation and Line 5430 gives control to statement 5070 advance to the next segment.

If it was determined in Line 5390 that the vehicle speed was not in violation, Line 5440 checks the status of the violation indicator. If the indicator is set, then the vehicle has just come out of violation and lines 5450 thru 5530 are to be executed.

Line 5450 clears the violation indicator.

Line 5460 increments the count of the number of speed violations.

Line 5470 calculates the length of the violation.

Line 5480 maintains the total number of miles of speed violations.

Line 5490 prints out the violation summary.

Line 5500 determines whether this was to be the last time thru the loop and if so control goes to statement 5094. If not, the three variables 'BDIST', 'MLIMIT' and 'MAXOVR' are reset to zero and line 5540 gives control to statement 5010 to advance the data. Upon having exhausted either the track or master data, control goes to Line 5570 to terminate the routine. Here statement 5090 checks the status of the violation indicator and if it is still set, Line 5580 indicates that this is the 'last' violation and line 5590 gives control to statement 5062 to print it out.

Finally, Line 5600 checks the violation count. If no violations were detected, line 5630 prints out the message, 'no speed violations detected'.

Otherwise, line 5610 prints out the number of violations and the total number of miles in violation.

In either case, control goes to statement 4000 to obtain the next request.

Lines numbers in the 7000's comprise the plot routine (FIGS. 3 and 20) which is entered from Line 4030 upon request to plot.

Line 7030 prints a message to prompt the operator to enter the plot 'limits'.

Line 7040 then reads the mile posts for the start and finish of the current plotting request.

Lines 7050 and 7060 similarly request and read the scale (or resolution) for the plot.

In Line 7070, if the scale just entered has a value of zero, the request is repeated. If the value read in has a value greater than zero, it specifies the number of lines per mile; if the value is less than zero it specifies the number of miles per line.

Based on this definition, lines 7080 and 7090 arrive at a value for the variable 'scale' which is the actual distance between each successive line in the plot. For example: if 20 lines/mile were requested, the value of scale would be 0.05 (1/20th).

Line 7100 insures that the starting mile post for the plot (start) is greater than or equal to the starting mile post for the recorded trip (startr).

Line 7110 calculates the number of lines to be printed as one more than the number of miles requested divided by the miles per line. If the number of lines is greater than a predetermined safety factor say (41), the routine requests permission to continue as follows;

At Line 7120 control is transferred to statement 7005 to begin the plot if the number of lines is within the limit. Otherwise, Line 7150 prints the number of lines and asks for permission to continue. The reply is read in line 7140 and if a 'yes' was not received, line 7150 returns control to statement 4000 to obtain a new request.

Lines 7160 through 7220 assign initial values to variables as required.

Lines 7230 thru 7300 obtain the appropriate master data to be used for the current line of plot.

Line 7230 advances the master record number.

Line 7240 checks whether the end of master data has been reached and if so control goes statement 7059 to end the routine.

Line 7250 calculates a new value for the master distance.

Line 7260 moves a blank character (CB) to the plot buffer where the old data was located.

Line 7270 calculates a new master data position (PM) as one more than ½ the speed limit.

Line 7280 moves the master character (CM=$) to the new position in the buffer.

Line 7290 replaces the data character (CD) since the master and data positions may coincide.

Finally, Line 7300 determines whether the master file has been advanced far enough to include the current line of the plot. If not, the above steps must be repeated.

Lines 7310 thru 7470 obtain the appropriate track data for the current line of the plot.

Line 7310 determines whether the track data file has been advanced far enough and if so control goes to statement 7030.

If not, Line 7320 increments the record number.

Line 7330 checks to see if the track data has been exhausted.

Line 7340 maintains the count of recording units encountered.

Line 7350 calculates the new data distance.

Line 7360 checks to see if the file needs to be further advanced.

Line 7370 moves a blank character to the old data position.

Line 7380 calculates the new position of the speed in the buffer.

Line 7390 limits the print position to the 52$^{ed}$ character.

Line 7400 replaces the master character since it may have coincided with the old data character which was removed, and Line 7410 places the data character (CD) in the buffer at its new position. For any record, the event code applies only to the last recording unit in the record. At the time of printing, the variable 'L' holds the appropriate value of the event code as determined by Lines 7420 thru 7460.

Line 7420 assings 'L' an initial value of 1 (no events).

In Line 7430 the event code is stored in the variable 'K'.

Line 7450 calculates the distance at which the event code takes effect (DISTE) at one unit (DCP) less than the distance for the end of the record (DISTD).

Line 7460 assigns 'L' the value of the event code (K) when the plotting distance exceeds the 'event distance' (DISTE).

Line 7480 determines how much of the plot buffer must be printed out to include both the master and the data characters. This step saves having to print blank characters to the right of the actual data and thus saves time.

Line 7490 causes the printing of the plot header (FIG. 4, Item 44), along with the data record number, if the distance is equal to the starting distance.

Line 7500 prints out the current line of the plot consisting of the distance (mile post), the event characters, and as many characters in the buffer as determined by the variable 'J'.

Line 7520 calculates the distance for the next line by adding the scale to the previous distance.

If the resulting distance is less than the final distance,

Line 7530 transfers control to statement 7015 to continue processing. Upon completion of the current plotting request (or upon having exhausted either the master or the track data), Line 7540 prints out of the bottom line of the plot and Line 7550 returns control to statement 4000 to obtain a new request.

Wherefore the following is claimed:

1. A method of analyzing performance data recorded on board a vehicle, the method comprising the steps;
communicating the recorded performance data to a storage medium remote from the vehicle;
converting the data in the storage medium to a preselected format;
loading the formatted data into a computer;
loading master data, representing a known performance profile, into the computer; and
comparing the performance data with master data in the computer, under the control of a program for deriving analytical results regarding performance.

2. A method for analyzing engineer performance data (track data) recorded on board a train, the method comprising the steps:
transmitting the recorded track data to a storage device at a remote data processing station;
converting the data in the storage device to a preselected format;
loading the formatted data into a computer;
loading master track data, representing a known performance profile into the computer; and
comparing the performance data with the master track data in the computer, under the control of a program for deriving analytical results regarding an engineer's performance.

3. A method for analyzing recorded data relating to the performance of a mass transit vehicle, comprising the steps of:
loading a file of formatted recorded performance data into a computer memory,
subjecting the recorded data along with master data to a comparison within the computer,
selecting one of a plurality of decision branches responsive to said comparison step, under the control of a program within the computer, for analyzing the recorded data in one of various data processing modes, and
wherein one of the data processing modes includes the step of analyzing the recorded data when compared with master data.

4. A method for analyzing recorded data relating to the performance of a mass transit vehicle, comprising the steps of:
loading a file of formatted recorded performance data into a computer memory,
subjecting the recorded data along with master data to a comparison within the computer,
selecting one of a plurality of decision branches responsive to said comparison step, under the control of a program within the computer, for analyzing the recorded data in one of various data processing modes, and
wherein one of the data processing modes includes the step of tabulating the recorded data for data examination.

5. A method for the analysis of a track data file for mass transit vehicle operation in comparison with master profile data, including a sequence for plotting analysis results on an output display device using data processing means, comprising the steps of:
entering the mileposts defining the beginning and end of a vehicle run to be plotted into the data processing means;
entering a resolution parameter indicative of a number of lines to be plotted for each mile of the run;
calculating in the data processing means the total number of lines to be plotted with respect to the mileposts;
comparing in the data processing means the result of the calculation with a preselected reference value stored in the data processing means to inhibit continuation of the sequence if the calculated value exceeds the reference value;
updating a master data file stored in the data processing means relative to mileposts, the master data file including preselected events and operation characteristics to which the track data file is compared;
storing preselected master file characteristics, for a given milepost, in a buffer for the plotting thereof by milepost;
updating the track data file relative to the same mileposts of the updated master file;
storing preselected track data file characteristics in the data processing means, corresponding to a current milepost of the updated master file, in the buffer for the plotting thereof by milepost;
transmitting the buffer contents to the output device for display; and
detecting the completion of the plot.

6. The method of claim 5 further comprising the step of determining, subsequent to the step of updating the master file, whether a current updated master milepost exceeds the last milepost contained in the master file.

7. A data processing system operating in accordance with a program for analyzing recorded track data from a vehicle run and printing out the results thereof, the system comprising:
 a digital computer;
 means for entering milepost data, from the vehicle run, into the computer;
 means for entering speed limit data between mileposts into the computer;
 means for entering recorded track data between mileposts into the computer;
 means associated with the computer for calculating the extent of speed violations between sequential mileposts;
 means associated with the computer for detecting the maximum speed between sequential mileposts; and
 means responsive to the computer for printing the recorded speed, the speed limit and the extent of speed violations keyed to respective sequential mileposts.

8. The subject matter of claim 7 together with means associated with the computer for totalizing the number of speed violations and the total number of miles traveled in violation.

9. A method for printing out a computer analysis of recorded track data from a vehicle run, comprising the steps of:
 entering recorded milepost data from the vehicle run into a computer system;
 entering speed limits between mileposts into the system;
 entering recorded track data between mileposts into the system;
 calculating the extent of speed violations between sequentially located mileposts;
 detecting the maximum speed violation between sequential mileposts; and
 printing out the entered speed limit, calculated speed violations and detected maximum speed on a printout line signified by respective sequential mileposts.

10. A computer system operating in accordance with a program for plotting recorded track data from a vehicle run and plotting the results thereof, the system comprising;
 a computer;
 means for entering track data from the vehicle run, into the computer, said data including milepost location, speed, event occurrence, and speed limits;
 plotting means connected to the computer output for plotting milepost location along a first axis;
 said plotting means further plotting speed as a function of milepost location;
 said plotting means further plotting speed limit as a function of milepost location; and
 said plotting means still further listing codes, representing respective events, adjacent corresponding milepost locations.

11. A digital computer program for plotting recorded track data from a vehicle run, the program comprising the steps:
 entering milepost data from the vehicle run into a computer, said data including milepost location, speed event occurrence, and speed limits;
 processing the data in the computer, in a format compatible with the plotting of the data on a printer;
 plotting milepost location along a first axis;
 plotting speed as a function of milepost location;
 plotting speed limit as a function of milepost location; and
 listing codes, representing respective events, adjacent corresponding milepost locations.

12. In a computer program for analyzing recorded vehicle operation data as compared with a recorded master data, the program having a routine for updating the vehicle operation data comprising the steps of;
 incrementing a data line counter to a current line;
 determining whether the incremented line count lies within the bounds of the recorded data;
 determining the actual speed of the vehicle, from the recorded data, at a current line;
 determining from the recorded data whether excessive power was applied during the current line;
 if it was, the program continues as follows:
 (a) producing an appropriate event code and accumulating a count of data lines analyzed;
 (b) computing the current distance by equating it with the starting distance contained in the first data line, added to a scaling factor which is multiplied by the accumulated count;
 (c) determining whether the current distance is less than a previous computed distance thus indicating reverse travel of the vehicle, a reverse travel determination causing the program to loop back to the beginning of the routine; and
 (d) storing the current distance when it is determined to be greater than the previous distance;
 continuing with the following steps in the event excessive power was not applied:
 (e) determining whether braking was applied and if not, the program continues with steps a-d, defined above, if yes, the routine continues with the following steps:
 (f) storing a produced event code relating to the braking;
 (g) determining whether the braking was due to the application of regular vehicle brakes;
 (h) determining whether the braking was due to the application of dynamic braking;
 (i) checking a master data file to determine whether a braking restriction existed at the current distance; and
 (j) returning the routine to steps b-d.

13. In a method for analyzing recorded vehicle operation data as compared with recorded master data, a sequence of steps for updating the master data on a computer, comprising the steps of:
 incrementing a master data line counter to a current line;
 determining whether the incremented line count lies within the bounds of the recorded master data;
 storing temporarily in a storage the distance associated with the current line of master data as well as a speed limit associated with that distance;
 storing temporarily in a storage an event code, corresponding to a predetermined operational event, associated with the current line of master data;
 comparing event codes of a previous and a current interval to determine whether they are the same; and
 equating the last event code to the current event code if there has been no change;

if there is a change, determining whether the master data signifies that the vehicle is entering a required dynamic braking event or whether it is leaving a required dynamic braking event;

(a) continuing with a first subsequence if entering a required dynamic braking event, the first subsequence comprising the steps of:

counting the number of preselected consecutive master data intervals that include a required dynamic braking event; and correlating the occurrence of the first required dynamic braking event with a particular milepost;

(b) continuing with a second subsequence if leaving a required braking event, the second subsequence comprising the steps of:

determining from the operation and master data, the percentage of time the vehicle had its dynamic brakes applied during the intervals when required to do so;

comparing the percentage with a preselected value below which a violation of the event is considered to have occurred; and displaying a violation if one is determined to have occurred;

(c) equating the last code to the current code if the master data indicates neither entering nor leaving a required dynamic braking event.

14. In a method for analyzing recorded vehicle operation data as compared with recorded master data, a sequence for checking vehicle speed on a computer, comprising the steps of:

comparing data representing operation speed with data representing the master speed, for a current interval, to determine whether a speed violation exists;

if a violation exists:

(a) computing the magnitude of the violation during the interval;

(b) determining whether the violation is greater than previously determined violations;

(I) if it is not, updating the master and operation data for checking speed of a subsequent interval;

(II) if it is, (i) storing temporarily in a storage the magnitude of the violation during the current interval, (ii) computing and storing the distance traveled during the violation, and (iii) updating the master and operation data for checking speed of a subsequent interval;

if a violation does not exist:

(c) determining whether an immediately previous interval included a violation;

(1) if it did not, updating of master and operation data for checking speed of a subsequent interval;

(2) if it did, storing temporarily in a storage a representation of accumulated violations, total violation distance during the current interval and the cumulative distance traveled by the vehicle in violation;

(d) displaying the violation in temporary storage, as a result of the previous step;

(e) determining whether the current interval is the last recorded interval of a trip;

(1) if it is not, storing temporarily in a storage the milepost where the vehicle exited from its violation, the distance where the maximum violation occurred, and the magnitude of the violation;

(2) if it is, determining whether any violations occurred during the entire trip and displaying a summary as to how many violations occurred and the total number of miles of violation, for the trip, if any.

15. In a method for analyzing recorded vehicle operation data as compared with recorded master data, the operating data having data marks signifying the beginning and end of a trip, a sequence for loading operation data into a computer memory comprising the steps of:

determining file format to select between preformatted and raw operation data;

(a) if pre-formatted operation data exists:

reading the pre-formatted operation data into memory for data processing;

(b) if raw operation data exists:

(1) reading the raw operation data into a temporary storage location;

(2) reformatting the data in temporary storage to a form acceptable for data processing;

(c) detecting the data marks in the data so that the beginning and end of the recorded trip are determined for comparison with the master data.

16. In a method for analyzing recorded vehicle operation data as compared with stored master data, the master data having data marks signifying predetermined points of a trip, a sequence for loading master data into a computer comprising the steps of:

reading the first record of master data into temporary storage;

checking the first record in temporary storage to determine whether an event code is present in the record signifying the occurrence of a preselected event at a particular distance along a vehicle trip;

(a) determining whether the code is indicative of a data mark;

if it is not:

(b) determining the current distance of the master data;

(c) updating the record;

(d) determining whether the updated record lies in bounds of the recorded master data;

(e) closing the file when the limit on master data is reached;

if the determination of step (a) is positive;

(f) determining whether the detected mark is the first detected mark;

if it is:

(g) storing temporarily the distance of the first mark, as a reference point for a vehicle trip, and continuing with steps b–e;

if step (f) is negative:

(h) determining whether the detected mark is the second detected mark;

if it is;

(i) calculating the distance between the first and second marks;

(j) continuing with steps b–e.

17. In a method for analyzing recorded vehicle operation data as compared with recorded master data, each operation datum including a character for signifying an event code which corresponds to the occurrence of at least one predetermined operational event, a sequence for reformatting event code data comprising the steps of:

determining whether a first predetermined bit of the event code character is set, indicating that all operational events have occurred during a particular sample interval from which the event code is derived;

if it is:

(a) temporarily storing the first predetermined bit;

if it is not:

(b) determining whether the event code character has a binary value less than a first predetermined amount, indicative of an invalid character;

if yes:

(i) storing temporarily a bit indicative of this invalidity which results from a record tape synchronization error; and (ii) shutting down the routine when the accumulated tape synchronization errors exceed a preselected value;

if a determination of step (b) is negative, indicative of a valid character:

(iii) subtracting the first predetermined bit from the character; and (iv) determining whether the resulting event code character has a binary value less than a second predetermined amount, indicative of an invalid character;

if yes, continuing with steps (i) and (ii);

if not, performing a division-multiplication of the character to make the character more compact for permanent storage.

18. In a method for analyzing recorded vehicle operation data as compared with recorded master data, each operation datum including a character corresponding to vehicle distance traveled during a corresponding interval, a sequence for reformatting distance data comprising the steps of:

(a) determining whether a first predetermined bit of the distance character is set, indicating whether the vehicle was traveling in a forward or reverse direction;

(b) determining whether a second predetermined bit of the distance character is set, indicating whether that particular condition occurred during a given distance and storing that indication of the braking condition when its presence is detected; and (c) accumulating distance intervals during which predetermined operational events do not change.

19. In a method for analyzing recorded vehicle operation data as compared with recorded master data, each operation datum, corresponding to an interval, including at least two characters, the first character signifying an event code corresponding to the occurrence of at least one predetermined operational event, and a second character indicating vehicle distance traveled, a sequence of steps for reformatting the data, comprising the steps of:

(a) selecting the event code characteristic for processing;

(b) determining whether a first predetermined bit of the event code character is set, indicating that all operational events have occurred during a particular sample interval from which the event code is derived;

if it is:

storing temporarily the first predetermined bit;

if it is not:

(c) determining whether the event code character has a binary value less than a first predetermined amount, indicative of an invalid character;

if yes:

(d) storing temporarily a bit indicative of this invalidity with results from a record tape synchronization error; and (e) shutting down the routine when the accumulated tape synchronization errors exceed a preselected value;

if the determination of (c) is negative, indicative of a valid character:

(f) subtracting the first predetermined bit from the character; and (g) determining whether the resulting event code character has a binary value less than a second predetermined amount, indicative of an invalid character;

if yes, continuing with steps (d) and (e);

if not:

(h) performing a division-multiplication of the character to make the character more compact for permanent storage;

(i) changing a character count to force the sequence to continue with an analysis of the second character (vehicle distance), the analysis comprising the steps of:

(j) determining whether a first predetermined bit of the distance character is set, indicating whether the vehicle was travelling in a forward or reverse direction;

(k) determining whether a second predetermined bit of the distance character is set, indicating whether a braking condition occurred during a given distance and storing an indication of the braking condition when its presence is detected;

(l) accumulating distance intervals during which predetermined operational events do not change, and (m) shutting down the routine when storage capability for data has been exhausted.

20. A method of plotting recorded track data from a vehicle run with the aid of a computer comprising the steps of:

entering milepost data from the vehicle run into a computer, said data including milepost location, speed event occurrence, and speed limits;

processing the data in the computer, in a format compatible with the plotting of the data on a printer;

plotting milepost location along a first axis;

plotting speed as a function of milepost location;

plotting speed limit as a function of milepost location; and listing codes, representing respective events, adjacent corresponding milepost locations.

21. In a method for analyzing recorded vehicle operation data as compared with a recorded master data, a sequence of steps performed in a computer for updating the vehicle operation data comprising the steps of:

incrementing a data line counter to a current line;

determining whether the incremented line count lies within the bounds of the recorded vehicle data;

determining the actual speed of the vehicle, from the recorded vehicle data, at a current line;

determining from the recorded data whether excessive power was applied during the current line;

performing a first subsequence of steps if excessive power was applied during the current line, said first subsequence comprising the steps of:

(a) producing an appropriate event code and accumulating a count of data lines analyzed;
(b) computing the current distance by equating it with the starting distance contained in the first data line, added to a scaling factor which is multiplied by the accumulated count;
(c) determining whether the current distance is less than a previous computed distance, thus indicating reverse travel of the vehicle;
(d) returning to the beginning of the sequence if a determination is made that the current distance is less than the previously computed distance; and
(e) storing the current distance if it is determined to be greater than the previous distance;

performing a second subsequence of steps if excessive power was not applied during the current line, said second subsequence comprising the steps of:
(a) determining whether braking was applied;
(b) continuing with steps a-d of the first subsequence if braking was not applied;
(c) continuing with the following steps in the second subsequence if braking was applied:
(d) storing a produced event code relating to the braking;
(e) determining whether the braking was due to the application of regular vehicle brakes;
(f) determining whether the braking was due to the application of dynamic braking;
(g) checking a master data file to determine whether a braking restriction existed at the current distance; and
(h) returning to steps b-e of the first subsequence.

22. Apparatus for generating a performance record for a tracked vehicle comprising:
means containing recorded data from a prior vehicle operation;
a computer having an input and an output;
means connectable to said means containing recorded data for entering said recorded data into said computer input;
means entering master track data into said computer input;
means in the computer receiving said recorded and master track data from said computer input for identifying and correlating predetermined combinations of recorded and master track data and producing data pertinent to said combinations;
means providing said data pertinent to said combinations to said computer output, wherein said data pertinent to said combinations contains information for reconstructing said prior vehicle operation.

23. Apparatus as recited in claim 22 wherein said predetermined combinations include mileposts on the master track data and speed on the recorded data.

24. Apparatus as recited in claim 23 wherein said correlation includes identification of speed in excess of a predetermined value.

25. Apparatus as recited in claim 24 wherein said vehicular operation is reconstructed as a graph of speed at each milepost.

26. Apparatus as recited in claim 22 further comprising means for reconstructing said prior vehicle operation.

27. Apparatus as recited in claim 26 wherein said reconstructing means comprises plotting means for said information for reconstructing.

* * * * *